US011477350B2

(12) United States Patent
Uyeno et al.

(10) Patent No.: US 11,477,350 B2
(45) Date of Patent: Oct. 18, 2022

(54) ACTIVE IMAGING USING A MICRO-ELECTRO-MECHANICAL SYSTEM (MEMS) MICRO-MIRROR ARRAY (MMA)

(71) Applicant: Raytheon Company, Waltham, MA (US)

(72) Inventors: Gerald P. Uyeno, Tucson, AZ (US);
Sean D. Keller, Tucson, AZ (US);
Benn H. Gleason, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/150,286

(22) Filed: Jan. 15, 2021

(65) Prior Publication Data

US 2022/0232144 A1    Jul. 21, 2022

(51) Int. Cl.
*H04N 3/08*   (2006.01)
*G01S 17/89*   (2020.01)
(Continued)

(52) U.S. Cl.
CPC .............. *H04N 3/08* (2013.01); *G01S 7/4817* (2013.01); *G01S 17/89* (2013.01); *G02B 6/4206* (2013.01);
(Continued)

(58) Field of Classification Search
None
See application file for complete search history.

(56) References Cited

U.S. PATENT DOCUMENTS 5,404,375 A   4/1995 Kroeger et al.
5,854,702 A   12/1998 Ishikawa et al.
(Continued)

FOREIGN PATENT DOCUMENTS

AU   2005213216 A1 *   9/2006   ............. G02B 27/28
AU   2005213231 A1 *   9/2006   ............. B82Y 20/00
(Continued)

OTHER PUBLICATIONS

U.S. Appl. No. 14/007,917, filed Aug. 31, 2020, Electronically Steered Inter-Satellite Optical Communication System With Micro-Electromechanical (MEM) Micromirror Array (MMA).
(Continued)

*Primary Examiner* — Reza Aghevli
(74) *Attorney, Agent, or Firm* — Schwegman Lundberg & Woessner, P.A.

(57) ABSTRACT

Imaging systems and method of optical imaging. One example of an imaging system includes an optical scanning subsystem including an optical source and a MEMS MMA, the MEMS MMA being configured to direct optical radiation generated by the optical source over an area of a scene, a detection subsystem including an optical sensor configured to collect reflected optical radiation from the area of the scene, and a fused fiber focusing assembly including a fused fiber bundle, a plurality of lenses coupled together and positioned to receive and focus the reflected optical radiation from the area of the scene directly onto the fused fiber bundle, a microlens array interposed between the fused fiber bundle and the optical sensor and positioned to receive the reflected optical radiation from the fused fiber bundle, and a focusing lens positioned to direct the reflected optical radiation from the microlens array onto the optical sensor. The MEMS MMA may be further configured to generate and independently steer multiple beams of optical radiation, at the same or different wavelengths, to more fully interrogate the area of the scene. The MEMS MMA through its Piston capability may be further configured to shape the optical beam(s) to execute a variety of optical functions within the beam steering device.

20 Claims, 8 Drawing Sheets

(51) Int. Cl.
  *G02B 26/10* (2006.01)
  *G01S 7/48* (2006.01)
  *G02B 6/42* (2006.01)
  *G02B 26/08* (2006.01)
  *H04N 5/235* (2006.01)
  *G01S 7/481* (2006.01)

(52) U.S. Cl.
  CPC ....... *G02B 26/0833* (2013.01); *G02B 26/101* (2013.01); *H04N 5/2354* (2013.01)

(56) References Cited

U.S. PATENT DOCUMENTS

| | | |
|---|---|---|
| 6,181,450 B1 | 1/2001 | Dishman et al. |
| 6,271,953 B1 | 8/2001 | Dishman et al. |
| 6,327,063 B1 | 12/2001 | Rockwell |
| 6,567,574 B1 | 5/2003 | Ma et al. |
| 6,792,028 B2 | 9/2004 | Cook et al. |
| 7,304,296 B2 | 12/2007 | Mills et al. |
| 7,593,641 B2 | 9/2009 | Tegge, Jr. |
| 7,626,152 B2 | 12/2009 | King et al. |
| 7,660,235 B2 | 2/2010 | Alicherry et al. |
| 7,667,190 B2 | 2/2010 | Mills et al. |
| 7,969,558 B2 | 6/2011 | Hall |
| 8,164,037 B2 | 4/2012 | Jenkins et al. |
| 8,301,027 B2 | 10/2012 | Shaw et al. |
| 8,305,578 B1 | 11/2012 | Mudge et al. |
| 8,311,372 B2 | 11/2012 | Anderson et al. |
| 8,368,889 B2 | 2/2013 | Schwiegerling et al. |
| 8,380,025 B2 | 2/2013 | Anderson et al. |
| 8,463,080 B1 | 6/2013 | Anderson et al. |
| 8,767,190 B2 | 7/2014 | Hall |
| 8,823,848 B2 | 9/2014 | Chipman et al. |
| 8,983,293 B2 | 3/2015 | Frankel et al. |
| 9,473,768 B2 | 10/2016 | Uyeno et al. |
| 9,477,135 B1 | 10/2016 | Uyeno et al. |
| 9,632,166 B2 | 4/2017 | Trail et al. |
| 9,857,226 B2 | 1/2018 | LeMaster et al. |
| 9,904,081 B2 | 2/2018 | Uyeno et al. |
| 9,927,515 B2 | 3/2018 | Keller et al. |
| 10,148,056 B2 | 12/2018 | Uyeno et al. |
| 10,209,439 B2 | 2/2019 | Keller et al. |
| 10,243,654 B1 | 3/2019 | Uyeno et al. |
| 10,267,915 B2 | 4/2019 | Uyeno et al. |
| 10,381,701 B2 | 8/2019 | Motoi |
| 10,444,492 B2 | 10/2019 | Hopkins et al. |
| 10,718,491 B1 | 7/2020 | Raring et al. |
| 10,969,598 B2 | 4/2021 | Fest et al. |
| 10,998,965 B2 | 5/2021 | Tong et al. |
| 11,042,025 B2 | 6/2021 | Uyeno et al. |
| 2002/0141689 A1 | 10/2002 | Qian et al. |
| 2002/0196506 A1 | 12/2002 | Graves et al. |
| 2003/0062468 A1 | 4/2003 | Byren et al. |
| 2003/0081321 A1 | 5/2003 | Moon et al. |
| 2003/0185488 A1 | 10/2003 | Blumenthal |
| 2004/0072540 A1 | 4/2004 | Wilson et al. |
| 2004/0081466 A1 | 4/2004 | Walther et al. |
| 2004/0141752 A1 | 7/2004 | Shelton et al. |
| 2004/0258415 A1 | 12/2004 | Boone et al. |
| 2005/0013003 A1* | 1/2005 | Marom ............... G02B 6/3594 359/619 |
| 2005/0031255 A1 | 2/2005 | Schroeder et al. |
| 2005/0100339 A1 | 5/2005 | Tegge |
| 2005/0122566 A1 | 6/2005 | Cicchiello |
| 2005/0288031 A1 | 12/2005 | Davis et al. |
| 2006/0038103 A1 | 2/2006 | Helmbrecht |
| 2007/0031157 A1 | 2/2007 | Yamada et al. |
| 2007/0036480 A1 | 2/2007 | Wu |
| 2008/0050064 A1 | 2/2008 | Sakai et al. |
| 2009/0202254 A1* | 8/2009 | Majumdar ......... H04B 10/1123 398/140 |
| 2010/0149533 A1 | 6/2010 | Fest |
| 2010/0166430 A1 | 7/2010 | Alten |
| 2012/0002973 A1 | 1/2012 | Bruzzi et al. |
| 2012/0008133 A1 | 1/2012 | Silny et al. |
| 2012/0114337 A1 | 5/2012 | Aoki |
| 2012/0155885 A1 | 6/2012 | Hannah et al. |
| 2013/0271818 A1 | 10/2013 | Bastien et al. |
| 2014/0063299 A1 | 3/2014 | Fest et al. |
| 2015/0099476 A1 | 4/2015 | Beals |
| 2015/0172218 A1 | 6/2015 | Beshai |
| 2015/0311981 A1 | 10/2015 | Inagaki et al. |
| 2015/0378242 A1 | 12/2015 | Auxier et al. |
| 2016/0003677 A1* | 1/2016 | Pezzaniti ................. G01J 4/04 427/553 |
| 2016/0043800 A1 | 2/2016 | Kingsbury et al. |
| 2016/0234703 A1 | 8/2016 | Aldana et al. |
| 2016/0294472 A1 | 10/2016 | Palmer et al. |
| 2017/0293137 A1 | 10/2017 | Zhao et al. |
| 2018/0231715 A1 | 8/2018 | Bishop et al. |
| 2019/0154921 A1 | 5/2019 | Xing et al. |
| 2020/0244359 A1 | 7/2020 | Csonka et al. |
| 2021/0088776 A1 | 3/2021 | Uyeno et al. |
| 2021/0091854 A1 | 3/2021 | Uyeno et al. |
| 2021/0092260 A1 | 3/2021 | Uyeno et al. |

FOREIGN PATENT DOCUMENTS

| | | | | |
|---|---|---|---|---|
| CN | 1393710 A | * | 1/2003 | ......... G02B 26/0841 |
| CN | 1393711 A | * | 1/2003 | ......... G02B 26/0841 |
| CN | 1393712 A | * | 1/2003 | ......... G02B 26/0841 |
| CN | 1393714 A | * | 1/2003 | ......... G02B 26/0841 |
| CN | 110226103 A | * | 9/2019 | ......... G01C 15/002 |
| DE | 102011104023.8 B4 | | 7/2019 | |
| EP | 2667142 A1 | | 11/2013 | |
| EP | 2533003 B1 | | 8/2018 | |
| WO | WO-2005125193 A1 | * | 12/2005 | ............. G03B 21/00 |
| WO | WO-2006042696 A1 | * | 4/2006 | ........... A61B 5/0066 |
| WO | WO-2010032224 A2 | * | 3/2010 | ......... G03F 7/70183 |
| WO | WO-2010049076 A2 | * | 5/2010 | ......... G02B 19/0023 |
| WO | WO-2014145792 A1 | * | 9/2014 | ................. G01J 4/04 |
| WO | WO-2014200581 A2 | | 12/2014 | |

OTHER PUBLICATIONS

U.S. Appl. No. 17/152,023, filed Jan. 19, 2021, Small Angle Optical Beam Steering Using Micro-Electro-Mechanical System (MEMS) Micro-Mirror Arrays (MMAS).
U.S. Appl. No. 17/150,330, filed Jan. 15, 2021, Optical System for Object Detection and Location Using a Micro-Electro-Mechanical System (MEMS) Micro-Mirror Array (MMA) Beamsteering Device.
U.S. Appl. No. 17/159,967, filed Jan. 27, 2021, Micro-Electro-Mechanical System (MEMS) Micro-Mirror Array (MMA) Steered Active Situational Awareness Sensor.
"U.S. Appl. No. 16/871,602, Non Final Office Action dated Nov. 9, 2020", 18 pgs.
"U.S. Appl. No. 16/871,602, Notice of Allowance dated Feb. 24, 2021", 5 pgs.
"U.S. Appl. No. 16/871,602, Response filed Feb. 8, 2021 to Non Final Office Action dated Nov. 9, 2020", 12 pgs.
"U.S. Appl. No. 17/007,917, Non Final Office Action dated Aug. 3, 2021", 35 pgs.
"U.S. Appl. No. 17/007,917, Response filed Dec. 1, 2021 to Non Final Office Action dated Aug. 3, 2021", 16 pgs.
"High Contrast IR Wire Grid Polarizers", Edmund Optics, [Online], Retrieved from the Internet: <URL: https://www.edmundoptics.com/f/high-contrast-ir-wire-grid-polarizers/14797/>, (Accessed Sep. 4, 2021), 1 pg.
"Mid-Wave Infrared (MWIR) and Long-Wave Infrared (LWIF) Waveplates", Edmund Optics, [Online]. Retrieved from the Internet: <URL: https://www.edmundoptics.com/f/mid-wave-infrared-mwir-and-long-wave-infrared-lwir-waveplates/14317/>, (Accessed Sep. 4, 2021), 2 pgs.
"Mirrorcle Technologies MEMS Mirrors—Technical Overview", Mirrorcle Technologies, Inc., (2018), 7 pgs.
Ayral, J.-L., et al., "Phase-conjugate Nd:YAG laser with internal acousto-optic beam steering", Optics Letters, vol. 16, No. 16, (Aug. 15, 1991), 1225-1227.
Chiu, Yi, et al., "Shape-Optimized Electrooptic Beam Scanners: Analysis, Design, and Simulation", Journal of Lightwave Technology, vol. 17, No. 1, (Jan. 1999), 108-114.

(56) References Cited

OTHER PUBLICATIONS

Kim, et al., "Demonstration of large-angle nonmechanical laser beam steering based on LC polymer polarization grating", Proc.. of SPIE vol. 8052 80520T, (May 13, 2011).

Kim, Jihwan, et al., "Wide-angle, nonmechanical beam steering using thin liquid crystal polarization gratings", Proc. of SPIE, vol. 7093, (2008), 12 pgs.

King, D F, et al., "3rd-Generation 1280×720 FPA development status at Raytheon Vision Systems", Proc. of SPIE vol. 6206 62060W-1, (2006), 16 pgs.

Norton, Andrew, et al., "High-Power Visible-Laser Effect on a 37-Segment Iris AO Deformable Mirror", Proc. SPIE 7595, MEMS Adaptive Optics IV, 759506, (Feb. 17, 2010), 12 pgs.

Salmon, J.T., et al., "An Adaptive Optics System for Solid-State Laser Systems used in Inertial Confinement Fusion", First Annual International Conference on Solid-State Lasers for Application of Intertial Confinement Fusion, Monterey, California, May 30-Jun. 2, 1995, (Sep. 17, 1995), 13 pgs.

Siegman, A. E., "Unstable optical resonators for laser applications", Proceedings of the IEEE, vol. 53, Issue 3, (Mar. 1965), 277-287.

Wang, Jinxue, et al., "Doppler Winds Lidar Technology Development and Demonstration", AIAA-2005-6772, Space 2005, Long Beach, California, Aug. 30-1, 2005, 11 pgs.

Yamamoto, R., et al., "Evolution of a Solid State Laser", Proc. SPIE 6552, Laser Source Technology for Defense and Security III, 655205, (May 10, 2007), 11 pgs.

U.S. Appl. No. 17/725,872, filed Apr. 21, 2022, Wavefront Correction for Aerodynamic and Atmospheric Effects to an Optical Sensor on a High-Speed Flight Vehicle.

"U.S. Appl. No. 17/007,917, Notice of Allowance dated Jan. 10, 2022", 14 pgs.

"U.S. Appl. No. 17/007,917, Supplemental Notice of Allowability dated Apr. 19, 2022", 2 pgs.

Bishop, Bob, "Northrop Grumman-Developed Beacon Illuminator Laser Proves Reliability in Airborne Laser Ground, Air Tests", Northrop Grumman Corporation, [Online]. Retrieved from the Internet: <URL: https://news.northropgrumman.com/news/releases/northrop-grumman-developed-beacon-illuminator-laser-proves-reliability-in-airborne-laser-ground-air-tests?>, (Aug. 13, 2009), 2 pgs.

Kelchner, Bryan, et al., "ABL beam control segment", SPIE, vol. 3381, (Sep. 8, 1998), 6 pgs.

\* cited by examiner

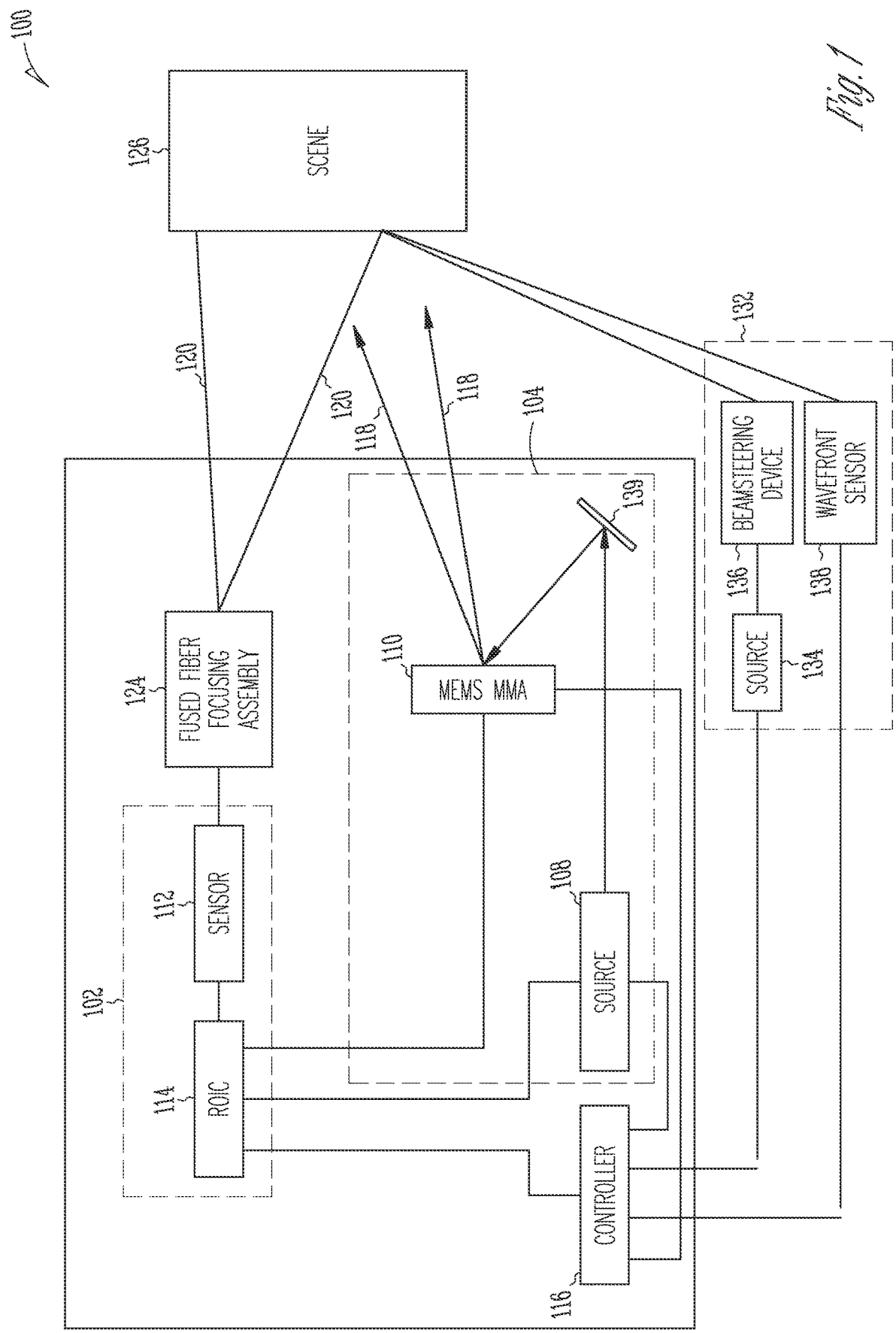

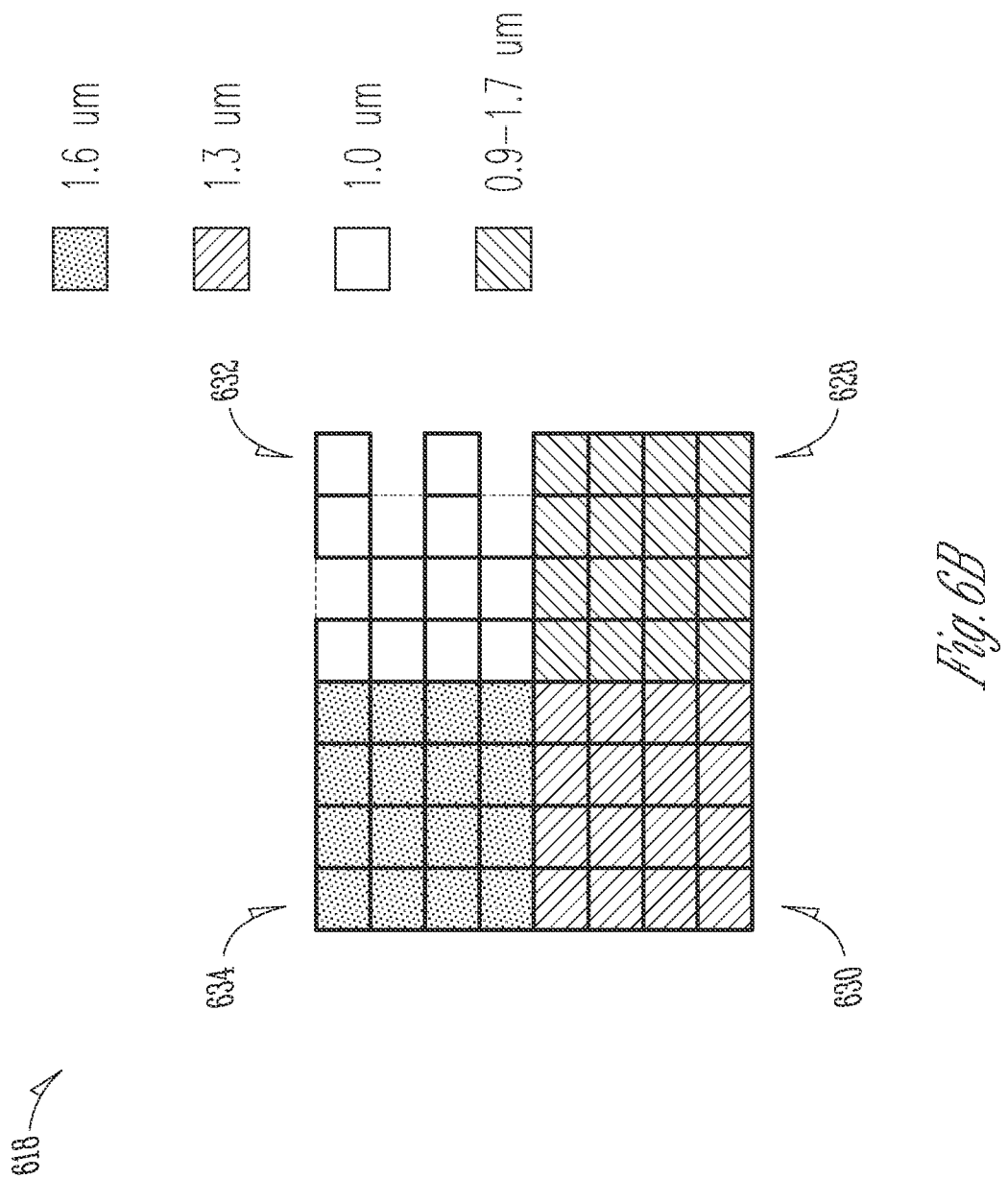

ACTIVE IMAGING USING A MICRO-ELECTRO-MECHANICAL SYSTEM (MEMS) MICRO-MIRROR ARRAY (MMA)

BACKGROUND OF THE INVENTION

Field of the Invention

This invention relates to active image in which laser radiation is used to image a scene and detect objects within that scene.

Description of the Related Art

Typical active optical systems use laser radiation to image a scene and detect objects within that scene. The scene is imaged by sensing reflections of the laser radiation at a detector, which often will include a Focal Plane Array (FPA). FPAs generally include an array of detector elements, or unit cells (i.e., pixels), organized in rows and columns. A circuit within each unit cell of the FPA accumulates charge corresponding to the flux of incident radiation at a photodetector within the unit cell. Typically, the charge within the unit cell is accumulated at a capacitive element, which produces a voltage proportional to the accumulated charge. The voltage corresponds to the intensity of the flux over a given time period referred to as the integration period (or integration interval). The resulting voltage is conveyed by additional circuitry to an output of the array, and may be used to generate an image. In some instances, the voltage or charge can be digitized by circuitry of the focal plane array resulting in binary values, at least one value for each unit cell of the focal plane array. Accordingly, some focal plane arrays may be used to convert a two-dimensional pattern of flux into a two-dimensional array of binary values, resulting in a digital image.

U.S. Pat. No. 10,382,701 entitled "Active Imaging Systems and Method" includes an optical scanning subsystem having an optical source and a liquid crustal waveguide (LCWG) configured to direct optical radiation generated by the optical source over an area of a scene. A detection subsystem includes an optical sensor configured to collect reflected optical radiation from the area of the scene. A fused fiber focusing assembly includes a fused fiber bundle, a plurality of lenses coupled together and positioned to receive and focus the reflected optical radiation from the area of the scene directly onto the fused fiber bundle, a microlens array interposed between the fused fiber bundle and the optical sensor and positioned to receive the reflected optical radiation from the fused fiber bundle, and a focusing lens positioned to direct the reflected optical radiation from the microlens array onto the optical sensor. In an embodiment, the reflected optical radiation is focused onto a single linear array of unit cells that form the optical sensor.

SUMMARY OF THE INVENTION

Aspects and embodiments are generally directed to optical systems and methods, and in particular, to optical systems (e.g., imaging systems) and methods which include solid-state active optical elements for improved weight reduction and reduced power consumption for long-range imaging and target tracking. In various aspects and embodiments, the imaging systems discussed herein may include an optical scanning subsystem configured to direct optical radiation over an area of a scene, a fused fiber focusing assembly positioned to collect reflections of the optical radiation from the area of the scene, and a detection subsystem arranged to direct the reflected optical radiation onto an optical sensor. As further discussed below, non-mechanical components of the imaging system, for example the fused fiber focusing assembly, may reduce the weight, size, and power consumption of the system relative to typical active imaging systems. Accordingly, various aspects and embodiments provide an optical system configured to perform rapid imaging scans while maintaining a reduced weight, size, and power consumption imaging system for ground, mobile, maritime, airborne, and space imaging environments. Accordingly, various aspects and embodiments provide an optical system configured to accommodate different wavelengths without having to change materials systems or steering parameters (voltages), to accommodate different wavelengths within a given system to provide a wavelength diverse interrogation of the scene, to generate and independently steer multiple beams of the same or different wavelengths to interrogate the scene. Accordingly, various aspects and embodiments provide a beam steering element that in addition to steering the optical radiation can shape the optical radiation to perform one or more functions including focusing the optical radiation, adjusting a size, divergence or intensity profile of the optical radiation, producing deviations in the wavefront of the optical radiation to compensate for atmospheric distortion, adjusting the phase to maintain a zero phase difference across the optical radiation, adding optical power to the optical radiation and/or optimizing diffraction losses for a given steering angle.

According to an aspect, provided is an imaging system. In one example, the imaging system comprises an optical scanning subsystem including an optical source and a Micro-Electro-Mechanical System (MEMS) Micro-Mirror Array (MMA), configured to direct optical radiation generated by the optical source over a first area of a scene, a detection subsystem including an optical sensor configured to collect reflected optical radiation from the first area of the scene, and a fused fiber focusing assembly including a fused fiber bundle, a plurality of lenses, the plurality of lenses being coupled together and positioned to receive and focus the reflected optical radiation from the first area of the scene directly onto the fused fiber bundle, a microlens array interposed between the fused fiber bundle and the optical sensor, the microlens array being positioned to receive the reflected optical radiation from the fused fiber bundle, and a focusing lens positioned to direct the reflected optical radiation from the microlens array onto the optical sensor.

In one example, the MEMS MMA is partitioned into a plurality of segments, each segment including a plurality of mirrors, and to tip and tilt the mirrors in each segment to re-direct the beam of optical radiation into a plurality of beams and to independently steer the beams in respective steering patterns over a plurality of areas of the scene. The mirrors in each segment may be configured to reflect light at different wavelengths providing a diversity of wavelengths among the plurality of beams to scan areas of the scene. This may be accomplished through a combination of sources of different wavelengths and/or optical coatings for the mirrors that reflect at different wavelengths. In one example, a beam that spans a specified band is scanned over the area to detect an object(s). Additional beans at specific wavelengths are steered to the one or more objects to interrogate the objects while the scan of the area is ongoing.

In one example, the MEMS MMA is provided with tip, tilt and piston control of the individual mirrors to both shape and steer the one or more beams. Each mirror rotates about X and Y orthogonal axes and translates along a Z-axis orthogonal the XY plane to tip, tilt and piston, respectively. In a physical instantiation of the MEMS MMA, each mirror is supported on flexures at three fulcrum points. The three different pairs of fulcrum points define three axes at 60 degrees to one another in the XY plane. Each mirror pivots about each of the axes to produce tilt, tip and piston in the XYZ space. In one example, the piston capability is used to focus the beam of optical radiation into, for example, a "fan" or "spot" beam, which can change on the fly. The piston capability may also be used to adjust a size, divergence or intensity profile of the beam, produce deviations in the wavefront of the beam to compensate for atmospheric distortion, provide deviations in the wavefront of the beam to adjust for path length variations to maintain a zero phase difference across the beam, add optical power to the beam and/or to approximate a continuous surface across define sections of the MMA to reduce diffraction losses.

In one example, the fused fiber bundle includes a cylindrical fiber taper including a plurality of ordered optical fibers. According to one example, the fused fiber bundle includes a plurality of ordered optical fibers arranged in a rectilinear pattern. In an example, the focusing lens is interposed between the microlens array and the optical sensor. According to an example, the imaging system further comprises a micromirror device positioned between a first lens and a second lens of the plurality of lenses, and at a focal point of the fused fiber focusing assembly.

In one example, the optical sensor includes a single linear array of unit cells, and the MEMS MMA is further configured to direct the optical radiation generated by the optical source in a first fan beam over the first area of the scene. In an example, the MEMS MMA is further configured to direct the optical radiation generated by the optical source in a second fan beam over a second area of the scene, the second area of the scene being different from the first area of the scene. According to an example, the imaging system further comprises a controller coupled to the detection subsystem and the optical scanning subsystem, and the controller is configured to generate a two-dimensional image of the scene based at least in part on the reflected optical radiation from the first area of the scene and reflected optical radiation from the second area of the scene. In an embodiment, the MEMS MMA may selectively alternate between focusing the optical radiation into a fan beam and a spot beam. In another embodiment, the MEMS MMA may generate and steer multiple beams over the scene, which are time multiplexed onto the single linear array of unit cells.

According to one example, the optical sensor includes a single unit cell, and the MEMS MMA is further configured to direct the optical radiation generated by the optical source in a spot beam over the first area of the scene. In an example, the optical source includes an active shortwave (SWIR) infrared laser configured to emit SWIR radiation in a wavelength range of approximately 0.9-1.7 micrometers.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 1 is a block diagram of an example optical system according to aspects of the invention;

FIGS. 6A and 6B are an example of a MEMS MMA configured to form and steer multiple beams at different wavelengths;

DETAILED DESCRIPTION OF THE INVENTION

Figure 2B:
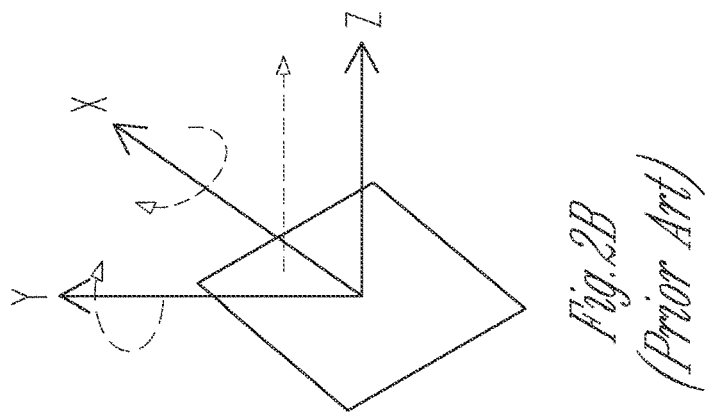
FIGS. 2A and 2B are illustrations of an embodiment of a Tip/Tilt/Piston ("TTP") MEMS MMA and a single mirror actuated to tip, tilt and piston (translate)

Aspects and embodiments relate to optical systems and methods of using the same. In particular, aspects and embodiments are directed to active solid-state optical systems and methods, and more specifically, to an active solid-state imaging system having a reduced size, weight, power consumption, and cost when compared to conventional imaging systems. Embodiments of the optical systems described herein include an optical scanning subsystem including an optical source and a MEMS MMA configured to direct optical radiation over an area of a scene, a fused fiber focusing assembly positioned to collect reflections of the optical radiation from the area of the scene, and a detection subsystem positioned to receive and integrate the reflected optical radiation. Optical radiation reflected from the area of the scene and received by the detection subsystem may be used to construct an image of the scene and/or view (e.g., track) an object within the scene.

The ability of an imaging system to accurately view a scene is generally dependent on the sensitivity of the detector, and the intensity of the optical radiation emitted by an illumination source. For example, in various conventional approaches to generating an image of a scene, the illumination source is positioned to continuously illuminate the entire scene within a Field of View (FOV) of detector. Such an approach not only consumes a great deal of power when continuously providing the intensity of illumination necessary for high-contrast imaging at long ranges, it makes power management challenging. Conventional solutions to these problems have suggested employing large power optical sources and complicated mechanical zoom assemblies to modify the FOV of the detector, and to achieve the desired performance. Other approaches have suggested positioning beamforming optics on a gimbal system, which would allow mechanical movement of the system to reduce power consumption. However, with these typical solutions the cost and weight of the associated system significantly increases while the speed of the system decreases, making mobile, maritime, airborne, and space applications much less practical.

Another approach uses a non-mechanical beamsteering waveguide (e.g. a liquid crystal waveguide (LCWG)) to steer optical radiation generated by an optical source over a desired area of a scene, and a fused fiber focusing assembly positioned to collect reflections of the steered optical radiation from the scene. In various embodiments, at least the fused fiber focusing assembly and waveguide reduce the size, weight, power consumption, and cost of the optical system when compared to various known approaches. However, the non-mechanical beamsteering waveguide and particularly the LCWG has been found to have a number of limitations, which may include, but are not limited to, steering a very narrow band of wavelengths about a center wavelength. Furthermore each material system e.g., substrates, coatings and liquid crystals, and voltage settings to steer the laser beam are unique to each center wavelength. Therefore to accommodate different wavelengths requires different LCWG devices and significant investment in materials, manufacturing, set-up and calibration etc. to design and field each device. The LCWG cannot manipulate the wavefront of the beam to, for example, focus the beam into a spot, to provide wavefront correction e.g. atmospheric distortion, or to compensate for path length differences across the beam. The LCWG can steer one and only one beam at the single wavelength. The LCWG cannot steer multiple beams of the same or different wavelengths. The LCWG is limited to receive the optical energy from a single optical source, it cannot combine the optical energy from multiple sources and focus that energy into a single focused optical beam to provide the active illumination.

Accordingly, various aspects and embodiments discussed herein provide an active imaging system configured to perform rapid imaging scans with the capability to manipulate the wavefront of the beam, to segment the beam into a plurality of independently steerable beams of the same or different wavelengths, while maintaining a reduced weight, size, and power consumption when compared to typical imaging systems. Various other advantages and benefits of the active imaging system and methods described herein are discussed below with reference to FIGS. 1-9.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 is a block diagram of an example optical system in accordance with various aspects and embodiments discussed herein. Among other components, the optical system 100 may include a detection subsystem 102, an optical scanning subsystem 104, a fused fiber focusing assembly 124 and a wavefront sense and correction subsystem 132. Each of the detection subsystem 102, the fused fiber focusing assembly 124, the optical scanning subsystem 104 and the wavefront sense and correction subsystem 132 may include various components in optical and/or electrical communication as further discussed herein.

As shown, the optical scanning subsystem 104 may include an optical source 108, and a MEMS MMA 110 coupled to the optical source 108, suitably via a fold mirror 139. In various embodiments, the detection subsystem 102 may include at least an optical sensor 112 and a Read-Out Integrated Circuit (ROIC) 114. The ROIC 114 may be coupled directly or indirectly to the optical sensor 112, the optical source 108, and/or the MEMS MMA 110, as shown in FIG. 1. As FIG. 1 also shows, the fused fiber focusing assembly 124 may be coupled to the optical sensor 112. In various further embodiments, the optical system 100 may further include control electronics such as a controller 116 coupled with the ROIC 114, the optical source 108, and/or the MEMS MMA 110. For instance, in FIG. 1, the controller 116 is shown interposed between the detection subsystem 102 and the optical scanning subsystem 104.

In various embodiments, the optical source 108 is in optical communication with the MEMS MMA 110 via fold mirror 139 and configured to generate and transmit a beam of optical radiation of a predetermined optical wavelength. For example, the optical source may include an active shortwave (SWIR) infrared laser configured to emit SWIR radiation in a wavelength range of approximately 0.9-1.7 micrometers. However, in other examples the optical source 108 may include any other suitable source of optical radiation, such as a NIR (near-infrared) laser source or a visible light source. In other examples, the optical source 108 may include a broadband source of radiation within the visible, SWIR, NIR or MWIR bands or spanning portions of those bands. In other examples, the optical source 108 may include multiple sources at different predetermined optical wavelengths configured to address different segments of the MEMS MMA. The mirrors of the MEMS MMA may have optical coatings that reflect a narrowband about a predetermined optical wavelength or that reflect a broadband about such a wavelength. Various combinations of sources and optical coatings may be configured to produce one or more steerable beams that include different optical wavelengths. A key attribute of the MEMS MMA is that neither the materials system of the MEMS MMA or the steering parameters (voltages) is a function of wavelength.

As FIG. 1 shows, in certain embodiments the MEMS MMA 110 is positioned to receive the transmitted beam of optical radiation from the optical source 108 via fold mirror 139. For example, the MEMS MMA 110 may receive the transmitted beam of optical radiation via an optical fiber or free space coupling. Responsive to receiving the optical radiation, the MEMS MMA 110 may be controlled to direct the optical radiation generated by the optical source 108 over an area of a scene (e.g., scene 126). This may include directing the optical radiation over a section of the scene that is less than the entire span of the scene. The MEMS MMA may be partitioned to simultaneously generate and steer multiple beams (of the same or different wavelengths) over the same or different areas of the scene. The MEMS MMA may, for example, steer one or more beams in a repetitive scan pattern over the area to detect objects and the adaptively generate and steer one or more beams (of the same or different wavelength composition) to interrogate the detected object. In particular, the MEMS MMA 110 may control the beamsteering of the optical radiation such that the beam of optical radiation is defined by a shape substantially corresponding to the dimensions of the optical sensor. For example, the MEMS MMA 110 may adjust a width of the beam of optical radiation in a direction substantially parallel to a plane at which the scene is positioned.

In FIG. 1, the beam of optical radiation is illustrated by lines 118, and the FOV of the detection subsystem 102 is illustrated by lines 120. As FIG. 1 shows, in certain embodiments the MEMS MMA 110 is configured to direct the optical radiation within a section of a field of view (FOV) of the detection subsystem 102. That is, in various embodiments the illuminated area of the scene may be less than the entire FOV of the detection subsystem 102. As also shown in FIG. 1, in some implementations the FOV of the detection subsystem 102 may not cover the entire span of the scene to be imaged. As discussed in further detail below, the MEMS MMA 110 may be operated to transmit the optical radiation in the direction of the scene as a "fan" beam or a "spot" beam. In one example, a "fan" beam includes a beam of optical radiation having a narrow beam width in one dimension (e.g., a horizontal direction), and a wider beam width in another dimension (e.g., a vertical direction). In contrast, a "spot" beam may include a beam of optical radiation having a concentrated area of substantially uniform shape (e.g., a circular shape). MEMS MMA 110 can switch back and forth between a "fan" beam and a "spot" beam and could simultaneously generate and steer both "fan" and "spot" beams.

In one embodiment, the MEMS MMA 110 may be coupled and in electrical communication with the ROIC 114 of the detection subsystem 102 and/or the controller 116. For example, the controller 116 of various embodiments may be configured to apply actuation voltages (e.g., analog actuation voltages) or "command signals" to the MEMS MMA 110 to adjust the Tip and Tilt, and possibly Piston, of the MEMS MMA individual mirrors, and adjust the beamsteering of the MEMS MMA 110. While described in one example as configured to receive a control voltage from the controller 116, in certain other examples the MEMS MMA 110 may instead include dedicated control circuitry, which specifies the beamsteering operations. For instance, the dedicated control circuitry may include application specific integrated circuitry or any combination of various hardware and logic circuitry.

In contrast to conventional beamsteering approaches, which typically require beamforming optics positioned on a pivoted support structure to accurately direct optical radiation, examples of the MEMS MMA 110 discussed herein remove the need for such gimbaled structures. Furthermore, the MEMS MMA 110 may be controlled to direct optical radiation generated by a single optical source (e.g., the optical source 108)(or multiple optical sources) over the area of the scene to be imaged. Accordingly, in addition to the various technical advantages discussed above, the MEMS MMA 110 of various aspects and embodiments improves the speed and accuracy of the optical system 100, as well as reduces the overall weight of the system 100, when compared to conventional approaches.

In certain examples, it is desirable to compensate for atmospheric distortion, which varies with time. The wavefront sense and correction subsystem 132 includes a source 134 positioned to emit electromagnetic radiation e.g. SWIR in an optical beam preferably having a "flat-top" intensity profile. Source 134 may be a pulsed laser at 1064 nm. A beam steerer 136 such as a rotating mirror, LCWG or MEMS MMA steers the beam to illuminate scene 126. A wavefront sensor 138 measures the wavefront of the reflected optical beam. Alternate embodiments may combine some or all functions of the imaging and wavefront correction sensor into a single system including the optical source, beam steering and sensor. Controller 116 generates command signals to configure the MEMS MMA to compensate for the atmospheric distortion via Piston actuation primarily.

Figure 2A:
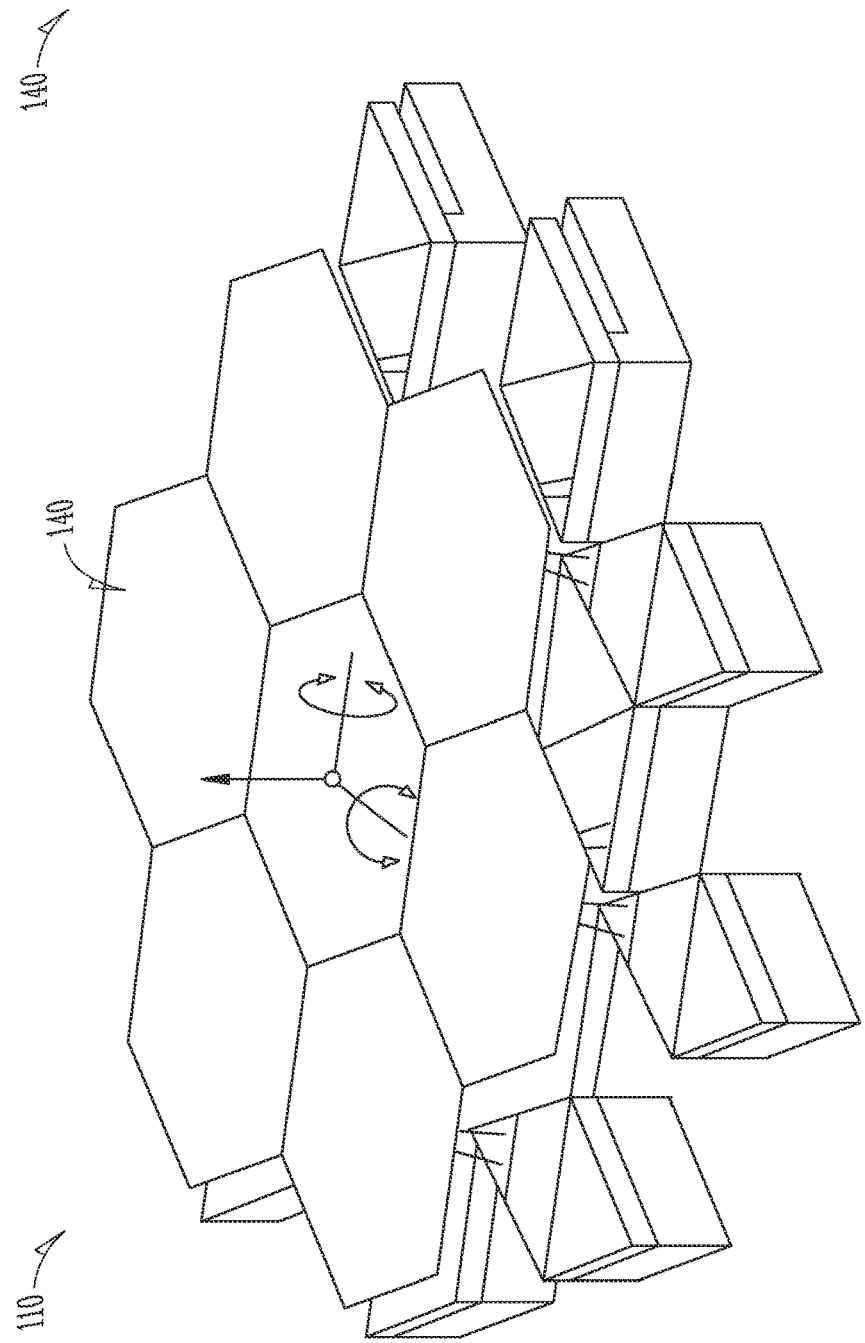
Figure 3:
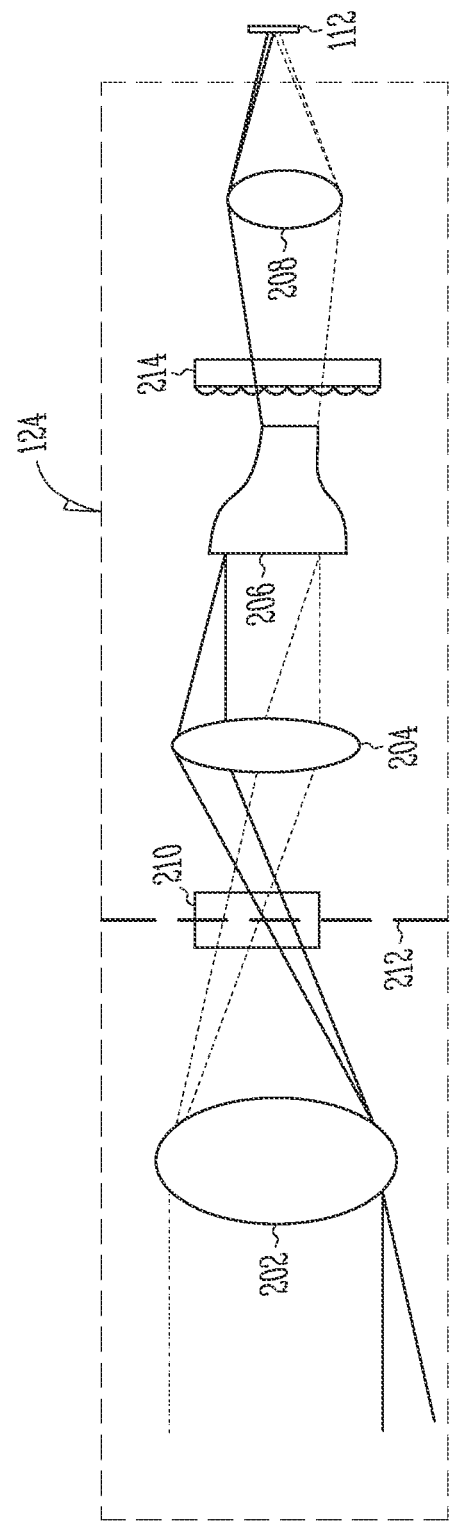
FIG. 3 is an example of a fused fiber focusing assembly of the example optical system shown in FIG. 1, according to aspects of the invention.

As best shown in FIGS. 2A-2B, Micro-Electro-Mechanical System (MEMS) Micro-mirror Array (MMA) 110 comprises a plurality of independently and continuously controllable mirrors 140 in an array in the XY plane to form and steer the optical beam(s). Each mirror is capable of at least "Tip" (rotation about an X-axis) and "Tilt" (rotation about a Y-axis). In preferred embodiments, each mirror is also capable of "Piston" (translation along a Z-axis, perpendicular to the XY plane) where the X, Y and Z are orthogonal axes in a three-dimensional space. The Piston capability can be used generically speaking to "shape" the beam(s) that are reflected off of the MEMS MMA. More specifically, the Piston capability can be used to focus the beam such as to form a "fan" or "spot" beam. The Piston capability can also be used to adjust the size, divergence or intensity profile of the beam, produce deviations in the wavefront of the beam to compensate for atmospheric distortions, adjust phase to maintain a zero phase difference across the beam, add optical power to the beam or to improve the formation and steering of the beam by approximating a continuous surface across the micro-mirrors, which reduces unwanted diffraction to increase power in the f optical beam. The MEMS MMA is preferably capable of steering an output laser beam over a range of at least −15°×+15° in tip and tilt (30°×30° and steering range) and +/−15 microns (at least one-half wavelength in either direction) piston at a rate of at least 1 KHz (<1 millisecond). The independently controllable mirrors can be adaptively segmented to form any number of optical beams, adjust the size/power of a given optical beam, generate multi-spectral optical beams and to combine multiple input sources. Further, the MEMS MMA must have a sufficient number of mirrors, mirror size/resolution, fill factor, range of motion, response time, response accuracy and uniformity across the array. One such MEMS MMA is described in U.S. Pat. No. 10,444,492 entitled "Flexure-Based, Tip-Tilt-Piston Actuation Micro-Array", which is hereby incorporated by reference. As shown in FIGS. 1-3 of the '492 patent this MEMS MMA uses flexures to support each mirror at three fulcrum points. The three different pairs of fulcrum points define three axes at 60 degrees to one another in the XY plane. Each mirror pivots about each axis to produce tip, tilt and piston in the XYZ space. This MEMS MMA is currently being commercialized by Bright Silicon technologies for "digitally controlling light."

In various embodiments, the system 100 includes a fused fiber focusing assembly 124 positioned to receive reflections of the optical radiation from the area of the scene illuminated by the optical scanning subsystem 104. The fused fiber focusing assembly 124 collects the reflected optical radiation and directs the reflected optical radiation to the optical sensor 12 of the detection subsystem 102. FIG. 3 shows one example of the fused fiber focusing assembly 124 according to various implementations. FIG. 3 is described with continuing reference to the example optical system 100 shown in FIG. 1.

The fused fiber focusing assembly 124 may include a plurality of lenses coupled together and positioned to receive and focus the reflected optical radiation from the area of the scene illuminated by the optical scanning subsystem. As shown in the example, the plurality of lenses may receive and focus the reflected optical radiation directly onto a fused fiber bundle 206 of the fused fiber focusing assembly 124. In one example, the plurality of lenses includes a first lens 202 optically coupled to a second lens 204. The first lens 202 may include an objective lens, for example. As FIG. 3 further illustrates, the plurality of lenses may also include a second lens 204 positioned to receive the reflected optical radiation from the first lens 202, and focus the radiation directly on the fused fiber bundle 206.

In certain examples, the fused fiber focusing assembly 124 may include a micro mirror device 210 positioned at a focal point of the objective lens 202 of the fused fiber focusing assembly 124, or another intermediate image in the fused fiber focusing assembly 124. That is, the micro mirror device 210 may be positioned at a predetermined distance between the first lens 202 and the second lens 204 of the example fused fiber focusing assembly 124 shown in FIG. 3. For example, in FIG. 3 the micro mirror device 210 is shown as positioned at an example focal point 212. The micro mirror device 210 may include a plurality of microscopic mirrors the individual manipulation of which may act as a field stop of the fused fiber focusing assembly 124. That is, in certain examples the micro mirror device 210 may limit the field angles of the reflected optical radiation received from the area of the scene illuminated.

Individual control of one or more of the microscopic mirrors of the micro mirror device 210 may reduce noise in images detected by the optical system 100. In particular embodiments, the controller 116 may apply one or more control signals, such as a controlled voltage, to the micro mirror device 210 to adjust a position of the one or more mirrors of the micro mirror device 210. Adjustments of the micro mirror device 210 performed by the controller 116 may include dynamic real-time adjustments to accommodate varying ambient conditions or application-specific conditions, and/or in certain embodiments, user-specified and/or predetermined adjustments to conform to one or more predetermined imaging applications.

Figure 4:
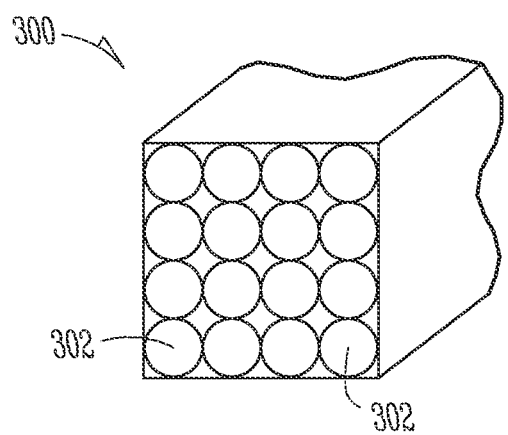
FIG. 4 is an example fused fiber bundle according to aspects of the invention.

In various embodiments, the fused fiber bundle 206 includes a plurality of optical fibers, such as non-imaging optical fibers, each bound together to form a single fused fiber bundle. Optical fibers of various implementations may be constructed from glass, or any other rigid or flexible suitable material. For example, individual optical fibers within the fused fiber bundle 206 may be constructed from an infrared transmitting plastic. Each optical fiber within the fused fiber bundle 206 may be coated in an anti-reflection coating to minimize noise and maximize transmissive efficiency. Within the fused fiber bundle 206, optical fibers may be arranged individually, or may be arranged in groups of optical fibers separated by one or more ordering elements, such as insulating spacers. Specifically, the optical fibers of the fused fiber bundle 206 may be arranged in one or more ordered patterns, such as a rectilinear arrangement. FIG. 4 shows one example of fused fiber bundle 300 having a plurality of optical fibers 302 arranged in a rectilinear pattern; however, in various other implementations other patterns of arrangement may be used.

Referring to FIG. 3, terminating ends of optical fibers at a receiving end of the fused fiber bundle 206 may be defined by a substantially planar flat surface. That is, the fused fiber bundle 206 may have a substantially planar receiving end at which each optical fiber of the fused fiber bundle 206 receives the reflected optical radiation from the plurality of lenses. In the example of FIG. 3, the fused fiber bundle 206 is shown receiving the reflected optical radiation from the second lens 204.

In certain embodiments, the fused fiber bundle 206 may include a fiber taper, and in one particular example, a cylindrical fiber taper. For example, FIG. 3 illustrates the fused fiber bundle 206 as a cylindrical fiber taper. The fiber taper may define a magnification ratio or de-magnification ratio to magnify or de-magnify the received optical radiation by a predetermined amount. Specifically, a ratio of the fiber taper diameters defines the magnification ratio for beam diameter and divergence. In a particular embodiment, ordered optical fibers of the fiber taper may minify received reflected optical radiation such that a spot size of the received optical radiation corresponds to one or more dimensions of the optical sensor 112. As discussed above, in various embodiments the fused fiber bundle 206 offers the advantage of improved weight and size when compared to various traditional receiving optics. Specifically, the fused fiber bundle 206 may replace traditionally larger and more cumbersome receiving optics as a result of the controlled illumination processes performed by various embodiments of the optical scanning subsystem 104.

For instance, in one example the fused fiber bundle 206 may define a 25 mm entrance face and an 8 mm exit face resulting in a magnification ratio of 0.32. Such an example would result in a highly diverging exit beam of 54°, for an input angle of 17.3°. The input angle of the fused fiber bundle 206 may be defined by the fiber acceptance angle of the fused fiber bundle 206, which in various examples is less than 17.3° relative to an axis of the fused fiber bundle 206. Accordingly, in various examples the first lens 202 and the second lens 204 limit the input angle of the received reflected optical radiation to 17.3° at the fused fiber bundle 206. Since the fused fiber bundle 206 accepts reflected optical radiation, which is quickly diverging, in various examples the fused fiber bundle 206 has a high fill factor to maintain efficiency.

Once collected at the receiving end of the fused fiber bundle 206, the reflected optical radiation propagates along the length of the fused fiber bundle 206 to a transmitting end of the fused fiber bundle 206. At the transmitting end, the reflected optical radiation is directed by the fused fiber bundle 206 to a microlens array 214. As illustrated, the micro lens array 214 is interposed between the fused fiber bundle 206 and the focusing lens 208, and positioned so as to receive the reflected optical radiation from the fused fiber bundle 206. In various embodiments, the microlens array includes a plurality of small lenses (e.g., no more than a few millimeters in diameter) coupled to a supporting substrate. Each of the lenses may have a circular aperture and may be arranged such that adjacent lenses do not overlap. As a result of the minifying effect of the fused fiber bundle 206 of certain examples, the reflected optical radiation transmitted from the fused fiber bundle 206 may have a small diameter, but quickly diverge (e.g., at range of angles greater than 50 degrees). Accordingly, in such an example a high numerical aperture of the microlens array 214 enables collection of the reflected optical radiation from the fused fiber bundle 206 over a wide range of angles. In particular examples, the microlens array 214 may allow collection of reflected optical radiation over an angular range greater than the angular range of divergence of the fused fiber bundle 206 (e.g., an angular range greater than 50 degrees).

As FIG. 3 shows, in one implementation, the reflected optical radiation is directed by the microlens array 214 to a focusing lens 208 interposed between the optical sensor 112 and the microlens array 214. In such an example, the focusing lens 208 may include a simple lens positioned to focus the reflected optical radiation onto the one or more unit cells of the optical sensor 112. In certain examples, each optical fiber, or group of optical fibers, within the fused fiber bundle 206 may map to a particular unit cell of the optical sensor 112. For example, a first group of optical fibers within the fused fiber bundle 206 may direct reflected optical radiation to a first unit cell, a second group of optical fibers may map reflected optical radiation to a second unit cell, a third group of optical fibers may map reflected optical radiation to a third unit cell, and etc. In such an arrangement, when reflected optical radiation is received at the fused fiber bundle 206, less than all of the optical fibers within the fused fiber bundle 206 may receive that reflected optical radiation. That is, optical fibers within the fused fiber bundle 206 corresponding to the area of the scene illuminated by the optical scanning subsystem may receive the reflected optical radiation, and optical fibers corresponding to areas of the scene outside of the illuminated area may not.

While shown in FIG. 1 as coupled to an optical scanning subsystem including an optical source (e.g., optical source 108) and a MEMS MMA (e.g., MEMS MMA 110) which may be operated to directly illuminate an area of the scene, in various embodiments, the fused fiber focusing assembly 124 may also permit collection of optical radiation responsive to flash illumination of the scene. In one example, the optical source 108 may include a flash illumination source that provides a brief "flash" of radiation to illuminate the scene. This may include a 1 ms-30 ms flash of a continuous beam. In the example where the optical source 108 provides a pulsed beam having a short pulse length (e.g., 10 ns-100 ns), "flash" illumination may include increasing the repetition rate of the optical source. During the flash illumination operations, an entire span, or a specific area, of the scene may be briefly illuminated. Reflections of the flash illumination may be received at the fused fiber focusing assembly and focused on the optical sensor 112. While MEMS MMA beamsteering may be particularly advantageous in certain applications and conditions, in certain other situations, the system 100 may include components for flash illumination processes.

Returning to FIG. 1, the system 100 may include an optical detector, which in certain examples includes the optical sensor 112. The optical sensor 112 of the detection subsystem 102 includes a plurality of individual detector elements, which may be referred to as unit cells or pixels. For example, in one implementation the optical sensor 112 may include a focal plane array (FPA) having a plurality of unit cells arranged in a series of rows and columns. However, in certain other examples the optical sensor 112 may have a reduced size compared to a typical FPA. For example, the optical sensor 112 may include a reduced number of unit cells, where the number of unit cells determines the resolution of the system 100. For example, the optical sensor 112 may include a single linear array of unit cells, or a single unit cell. In another implementation, optical sensor 112 may include multiple FPAs or linear arrays of unit cells to detect different wavelengths.

When activated, each unit cell of the optical sensor 112 is designed to collect and integrate photons of light impinging on that respective unit cell. A circuit within each unit cell of the optical sensor 112 accumulates charge corresponding to the flux of incident optical radiation during the integration period. In one implementation, each unit cell of the optical sensor 112 may include a complementary metal-oxide semi-conductor (CMOS) sensor or a charge-coupled-device (CCD). In some embodiments, charge-injection devices (CIDs) may also be used for unit cells.

In various embodiments, the ROIC 114 is in optical and electrical communication with the optical sensor 112, and in particular, each unit cell of the optical sensor 112. The ROIC 114 is configured to activate each unit cell of the optical sensor 112 during the integration period. In particular, the ROIC 114 of various embodiments is configured to activate unit cells of the optical sensor 112 to collect reflections of the optical radiation reflected from the area of the scene illuminated by the optical scanning subsystem 104. Activation of unit cells of the optical sensor 112, and control of the optical sensor 112, is further discussed below with reference to FIG. 5.

While discussed herein in one example as including a two-dimensional arrangement of unit cells in one or more rows or columns, in various embodiments of the optical sensor 112 shown in FIG. 1 may include unit cells arranged in any suitable pattern. In particular implementations, the optical sensor 112 may include a single linear of array of unit cells. For example, the single linear array of unit cells may include a single row or single column of unit cells. However, in certain other examples the optical sensor 112 may include a few rows or columns (e.g., less than ten) to accommodate a height of the image orthogonal to a dimension of the beam width. The width of the beam of optical radiation steered by the MEMS MMA 110 may correspond to the dimensions of the optical sensor 112, such as the dimensions of the single row or column of unit cells. Furthermore, the speed of any given scan (or flash) performed by the optical scanning subsystem 104 may be controlled relative to the width of the beam of optical radiation, and the dimensions of the optical sensor 112. For example, small optical beam widths may require faster scanning relative to large beam widths.

"Row" and "column" as used herein, may be interchanged according to various embodiments. That is, although "row" may generally be used to refer to a horizontal positioning (i.e., an x-direction in a Cartesian coordinate system) and "column" may generally be used to refer to a vertical positioning (i.e., a y-direction in a Cartesian coordinate system), as used herein either may be used to refer to a horizontal positioning and a vertical positioning relative to the other.

In various embodiments, the optical scanning subsystem 104, and in particular, the MEMS MMA 110 is configured to direct optical radiation over an area of the scene that corresponds to the activated unit cells of the optical sensor 112. In one embodiment, the ROIC 114 is configured to activate one or more unit cells of the optical sensor 112 responsive to direction of the optical radiation by the MEMS MMA 110. For example, the controller 116 may generate a synchronization signal, and transmit the synchronization signal to the optical scanning subsystem 104 and the ROIC 114. In certain embodiments, the synchronization signal received by one, or both, of the ROIC 114 and optical scanning subsystem 104 corresponds to a frame rate of the detection subsystem 102. The frame rate of the detection subsystem 102 refers to the snapshot operation of each individual unit cell of the optical sensor 112, and the frequency at which the optical system 100 generates consecutive images (i.e., frames). The synchronization signal received by one, or both, of the ROIC 114 and optical scanning subsystem 104 may be triggered by frame rate to align the optical scanning subsystem 104 with the detection subsystem 102. That is, in certain embodiments a synchronization signal may be generated at the beginning of a frame interval of a given frame.

After the expiration of the integration period, the ROIC 114 is configured to deactivate each unit cell of the optical sensor 112 and read out a value for each deactivated unit cell. Each read out value may be transmitted to other components of the optical system 100 and used to construct an image of the illuminated area of the scene, and/or view (e.g., track) one or more objects within the scene. In certain embodiments, the integration period may be about the same as the frame interval of a frame of the detection subsystem 102. In particular, the duration of the integration period and the duration of time it takes to read-out the unit cells of the optical sensor 112, may be substantially equal to the duration of one frame of operation. Such an embodiment may be advantageous in low flux conditions where unit cells may be activated for a longer duration. However, in various other embodiments, the integration period may be substantially less than the frame interval of a frame of operation of the detection subsystem 102. Such an embodiment may be advantageous when flux conditions are high. In such an embodiment, the ROIC 114 may activate the unit cells of the optical sensor 112 during a fraction of the frame interval, and the unit cells of the optical sensor 112 may be configured to hold the stored charge for the remainder of the frame interval.

In various embodiments, the MEMS MMA 110 is configured to adjust a magnification of the optical scanning subsystem 104 by use of its Piston capability. Tip/Tilt/Piston of the mirrors can operate to both steer the beam and to impose optical power to magnify the beam. Responsive to receiving one or more commands from the controller 116, the MEMS MMA 110 may be configured to rapidly and automatically adjust the magnification of the optical scanning subsystem 104.

As discussed above, the optical radiation transmitted from the MEMS MMA 110 may include a "fan" beam or a "spot" beam. Accordingly, in some embodiments the MEMS MMA 110 may control the divergence of the optical radiation, and in other embodiments it may simply expand or reduce the optical radiation. For example, the MEMS MMA 110 may change in shape according to a Powell lens configured to provide a "fan" beam. In other examples, the MEMS MMA 110 may reconfigure a fan beam to a spot beam or reconfigure a spot beam to a fan beam.

In an embodiment where the optical radiation includes a "fan" beam provided by the MEMS MMA 110, the optical scanning subsystem 104 may be configured to direct the optical radiation in a single linear direction based on a frame interval of the frame rate of the system 100. For example, the MEMS MMA 110 may be configured to control a width of beam divergence of the optical radiation along a first axis (e.g., in a vertical direction relative to the scene to be imaged), and a width of beam divergence of the optical radiation along a second axis (e.g., in a horizontal direction relative to the scene), substantially perpendicular to the first axis. In contrast, in an embodiment where the optical radiation includes a "spot" beam, the optical scanning subsystem 104 may illuminate the portion of the scene to be imaged in a two-dimensional pattern.

Referring again to FIG. 1, in various embodiments the optical system 100 may include a controller 116 coupled and in electrical communication with the components of the optical scanning subsystem 104, and components of the detection subsystem 102. For example, the controller 116 may be in electrical communication with the ROIC 114, the optical source 108, and the MEMS MMA 110, of various embodiments. The controller 116 may include a single controller; however, in various other embodiments the controller 116 may consist of a plurality of controllers and/or control circuitry.

While the controller 116 is illustrated separate from the one or more components of the optical system 100, in various embodiments, the controller 116 may be combined with the one or more other components of the optical system 100, such as the ROIC 114. For instance, the controller 116, ROIC 114, and other combined components of the optical system 100 may include a combination of software-configured elements, control circuitry, signal processing circuitry, application specific integrated circuitry, radio-frequency integrated circuitry, or any combination of various hardware and logic circuitry for performing the various processes discussed herein. For instance, the controller 116 of various embodiments may include a processor core, memory, and programmable input/output components. The controller 116 may be configured to automatically and/or dynamically control various components of the optical system 100, such as the MEMS MMA 110.

In particular, in various embodiments an input/output component of the controller 116, such as a user interface, is configured to receive an input specifying an area of the scene to be imaged. For instance, the user interface may accept information from an external input source, such as a button, switch, keyboard, trackball, joystick, touch screen, mouse device, or any other suitable external input device. In various embodiments, responsive to receiving the user input, the controller 116 is configured to dynamically adjust a control signal applied to the MEMS MMA 110 to adjust the area of the scene illuminated. In at least one embodiment, the controller 116 may be further configured to automatically and/or dynamically control the MEMS MMA 110 to expand the FOV of the detection subsystem 102 from a first FOV to a second FOV to include the specified area of the scene.

Figure 5:
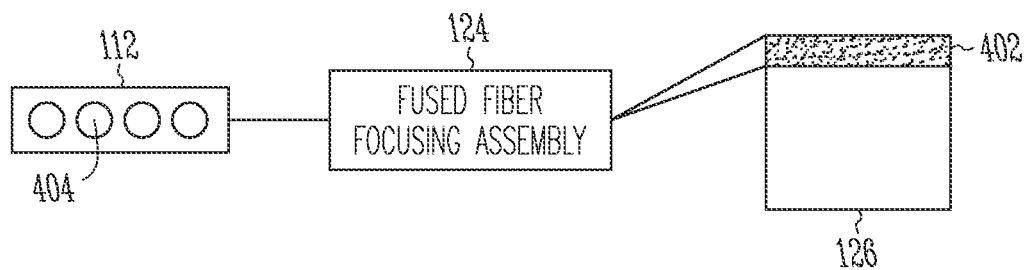
FIG. 5 is an example illustration of optical radiation received at the optical sensor of the optical system illustrated in FIG. 1, according to aspects of the invention.

As discussed with reference to at least FIG. 1, in certain examples the optical sensor may include a reduced number of unit cells (e.g., less than a full FPA). One such example is illustrated in FIG. 5. In particular, FIG. 5 is an example illustration of optical radiation reflected from an area of the scene 402 and received at the optical sensor 112. In the illustrated example, the optical sensor 112 is shown as including a single linear array of unit cells 404. Such an arrangement may be particularly advantageous when the optical radiation is directed by the MEMS MMA 110 in one or more fan beams (e.g., fan beam). FIG. 5 is described with continuing reference to the optical system 100 illustrated in FIG. 1.

In certain examples, the controller 116 may be coupled to the detection subsystem 102 and may be configured to generate one or more images of the scene based on one or more consecutive scans performed by the MEMS MMA 110. In the illustrated example of FIG. 5, the MEMS MMA 110 may direct the optical radiation generated by the optical source in a first fan beam (e.g., fan beam 402) over a first area of the scene. Subsequently, the MEMS MMA 110 may direct the optical radiation generated by the optical source in a second fan beam (not illustrated) over a second area of the scene. In such an example, the second area of the scene is a different from the first area of the scene. Based on the received reflections corresponding to the optical radiation scanned over the first area of the scene and the second area of the scene, the controller 116 may generate a two-dimensional image of the scene. For example, the controller 116 may execute one or more image construction algorithms to piece-together consecutive scans of the areas of the scene 216.

In certain other examples, the optical sensor 112 may include only a single unit cell, such as one of the unit cells 404 illustrated in FIG. 5. Such an implementation may be particularly beneficial when the optical radiation is directed by the MEMS MMA 110 in one or more spot beams. To achieve a spot beam, and/or reconfigure between a spot beam and a fan beam, the MEMS MMA 110 may be configured to control a width of beam divergence of the optical radiation along a first axis (e.g., in a vertical direction relative to the scene to be imaged), and a width of beam divergence of the optical radiation along a second axis (e.g., in a horizontal direction relative to the scene to be imaged), substantially perpendicular to the first axis. As discussed herein, the spot beam may include a beam of optical radiation having a concentrated area of substantially uniform shape. In particular, the uniform shape may correspond to the dimensions of the single unit cell of the optical sensor 112 of one implementation. One or more scans of the spot beam over different areas of the scene may be sequentially collected at the optical sensor 112 to piece-together an image of the scene using a suitable image construction algorithm, or detect the presence or absence of an object within the scene.

In certain other examples, the detection subsystem 102 and the optical scanning subsystem 104 may be configured to operate in a target tracking mode of operation. In such an embodiment, the MEMS MMA may illuminate an area of a scene that corresponds to a desired target. For instance, the target may include an object within the scene (e.g., a vehicle). In certain examples, the tracking mode of operation may be initiated by receipt of an input (e.g., user input) identifying an intended target within the scene. Instead of constructing a full image of the scene from a series of consecutive scans, as discussed above, during the tracking mode of operation the controller 116 may sample the received reflections of the optical radiation to detect the presence, or absence, of the target within the area of the scene illuminated. Such an implementation may allow a user to track an object within the scene, without the need to generate a full image of the scene. In addition to the various arrangements discussed herein, such a mode of operation may further reduce the power consumption of the system 100 when compared to typical imaging approaches. In another embodiment, the MEMS MMA may illuminate an area of a scene with one or more beams in a repetitive scan pattern to detect the presence of a target. While this scan is ongoing, the MEMS MMA may partition itself to generate and steer one or more additional beams, at the same or different wavelengths, to track or interrogate the target to gain additional information about the target.

An advantage of the MEMS MMA is its ability to be partitioned on the fly into multiple segments and possibly sub-segments to simultaneously create, shape and steer multiple beams of the same or different wavelengths. The segments and sub-segments do not need to be equally sized, can be any portion of the array and can be changed on the fly in number, size or location. Diverse wavelengths can be realized without changing either the MEMS MMA or the steering parameters (voltages) through some combination of the optical source(s) and optical coatings on the mirrors. For example, mirrors in different segments may have optical coatings that reflect at different wavelengths an illuminated with a broadband source thereby creating discrete optical beams with different wavelengths. Alternately, multiple sources at different wavelengths may be used to illuminate different segments of the MMA in which the mirrors either have broadband optical coatings or optical coatings tuned to the source.

Figure 6A:
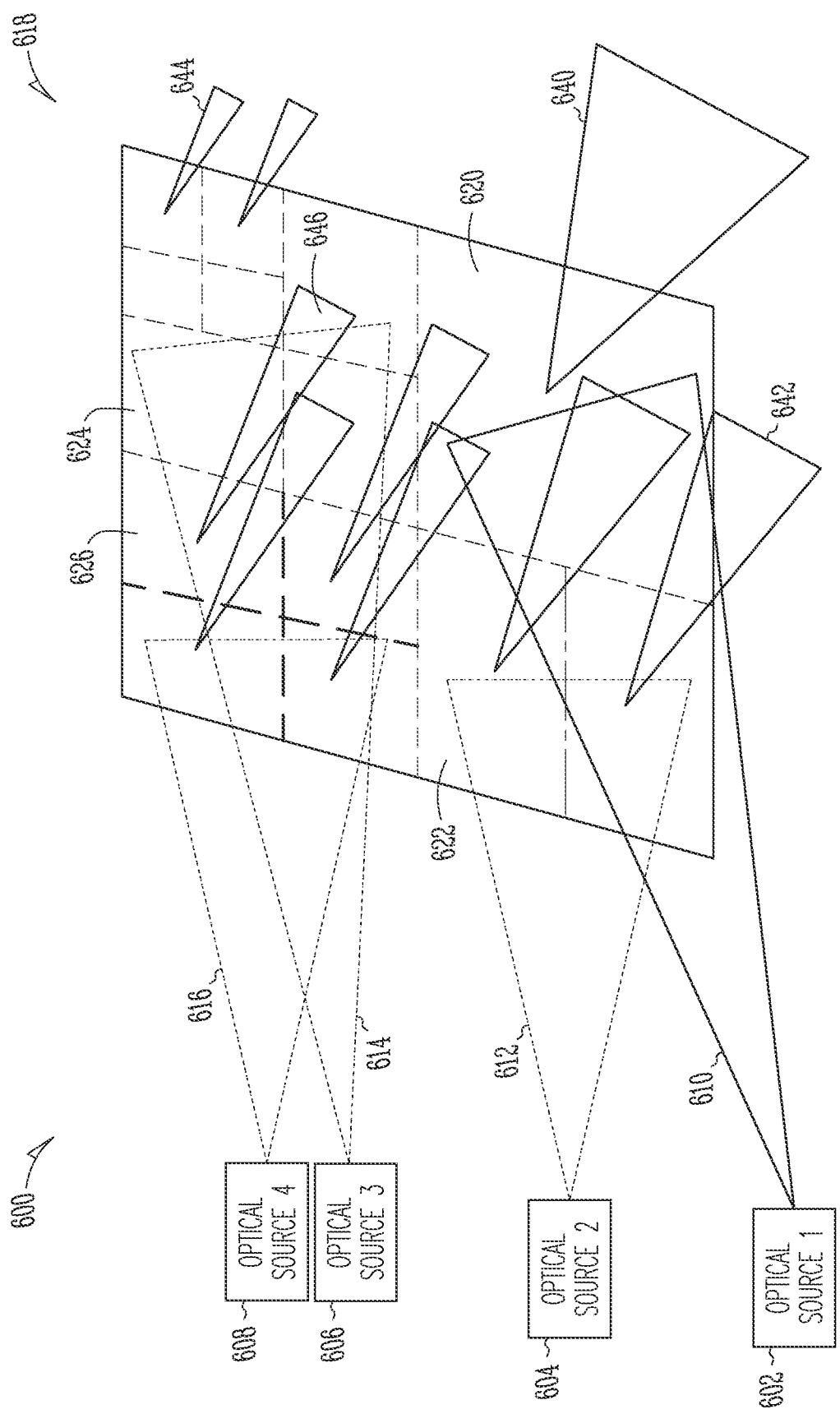

Referring now to FIGS. 6A and 6B, an embodiment of an optical scanning system 600 includes four optical sources 602, 604, 606 and 608 that generate optical radiation 610, 612, 614 and 616 at different wavelengths. For example optical source 602 generates broadband optical radiation 610 that spans the short-wave IR (SWIR) band of approximately 0.9 to 1.7 micrometers. Optical sources 604, 606 and 608 generate narrowband optical radiation 612, 614 and 618 at 1.0, 1.3 and 1.6 micrometers, respectively. A MEMS MMA 618 is partitioned into four segments 620, 622, 624 and 626 each including a plurality of mirrors capable of at least tip and tilt and possibly tip, tilt and piston. The mirrors in segments 620, 622, 624 and 626 are provide with optical coatings 628, 630, 632 and 634 that are reflective in a broadband to cover the SWIR band and narrowbands about 1.0, 1.3 and 1.6 micrometers, respectively. Optical radiation 610, 612, 614 and 616 illuminates the mirrors in segments 620, 622, 624 and 626, respectively. In response to command signals, the mirror in each segment tip, tilt and possibly piston to form and steer a broadband SWIR beam 640 and narrowband beams 642, 644 and 646 at 1.0, 1.3 and 1.6 micrometers, respectively. In this example, a single broadband SWIR beam 640 is generated to direct optical radiation over an area of the scene. The other segments are further petitioned into sub-segments to generate multiple narrowband beams at each wavelength. This may be done, for example, to revisit objects detected by the broadband SWIR beam 640 to gain additional and more precise information about the object. The number and wavelength diversity of the beams can adapt on the fly in response to system requirements.

Another advantage of MEMS MMAs that have piston capability in addition to tip and tilt is the ability to "shape" the beam to integrate one or more optical functions with the beam steering capability. More specifically, the Piston capability can be used to focus the beam such as to form a "fan" or "spot" beam. The Piston capability can also be used to adjust the size, divergence or intensity profile of the beam, produce deviations in the wavefront of the beam to compensate for atmospheric distortions, adjust phase to maintain a zero phase difference across the beam, add optical power to the beam or to improve the formation and steering of the beam by approximating a continuous surface across the micro-mirrors, which reduces unwanted diffraction to increase power in the f optical beam.

Figure 7:
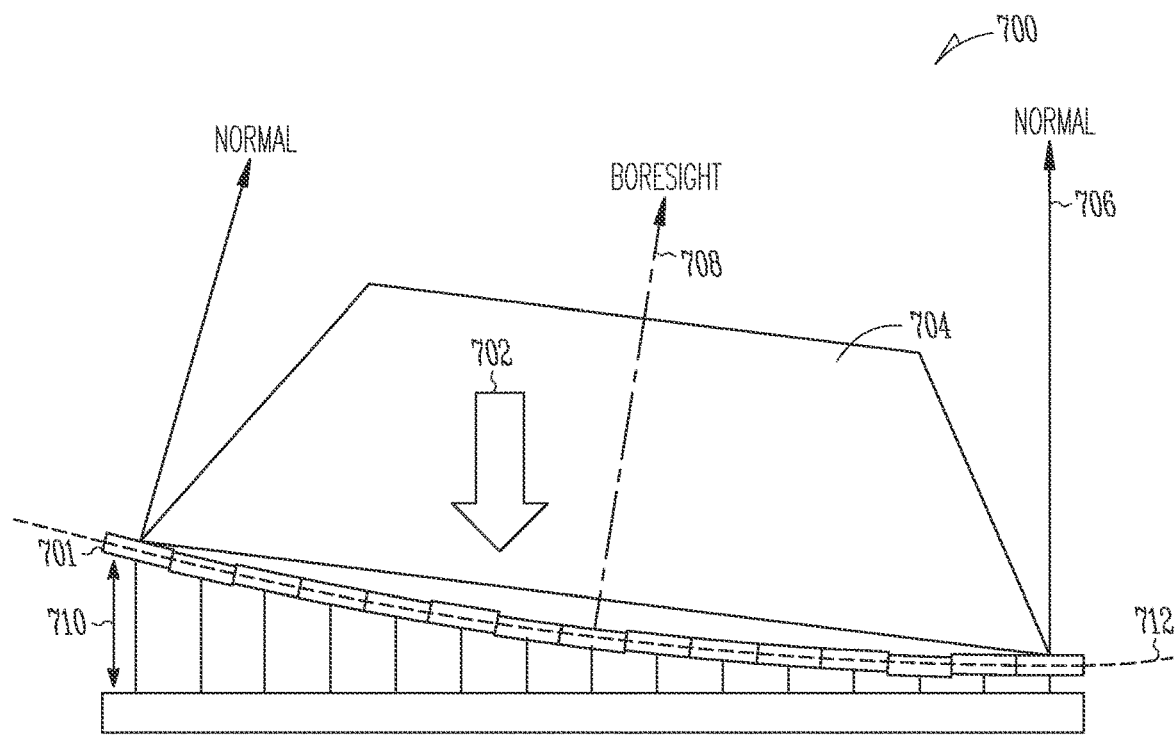
FIG. 7 is an example of using the Piston capability of the MEMS MMA to provide optical power to focus the optical beam and to mitigate diffraction losses.

As illustrated in FIG. 7 responsive to command signals a MEMS MMA 700 tips and tilts its mirrors 701 to form a reflective lens to focus optical radiation 702 into an optical beam 704. The angle of the normal 706 of each mirror to the boresight 708 in the plane of the axis is the same for all mirrors in each concentric circle of mirrors. The MEMS MMA 700 pistons (translates 710) mirrors 701 to approximate a continuous mirror surface 712 that itself approximates a single surface free-space reflective optical mirror. Each mirror can suitably translate at least ½ wavelength and typically several wavelengths in either direction to form the continuous mirror surface 712. The edge discontinuities and loss of power are minimized.

Figure 8:
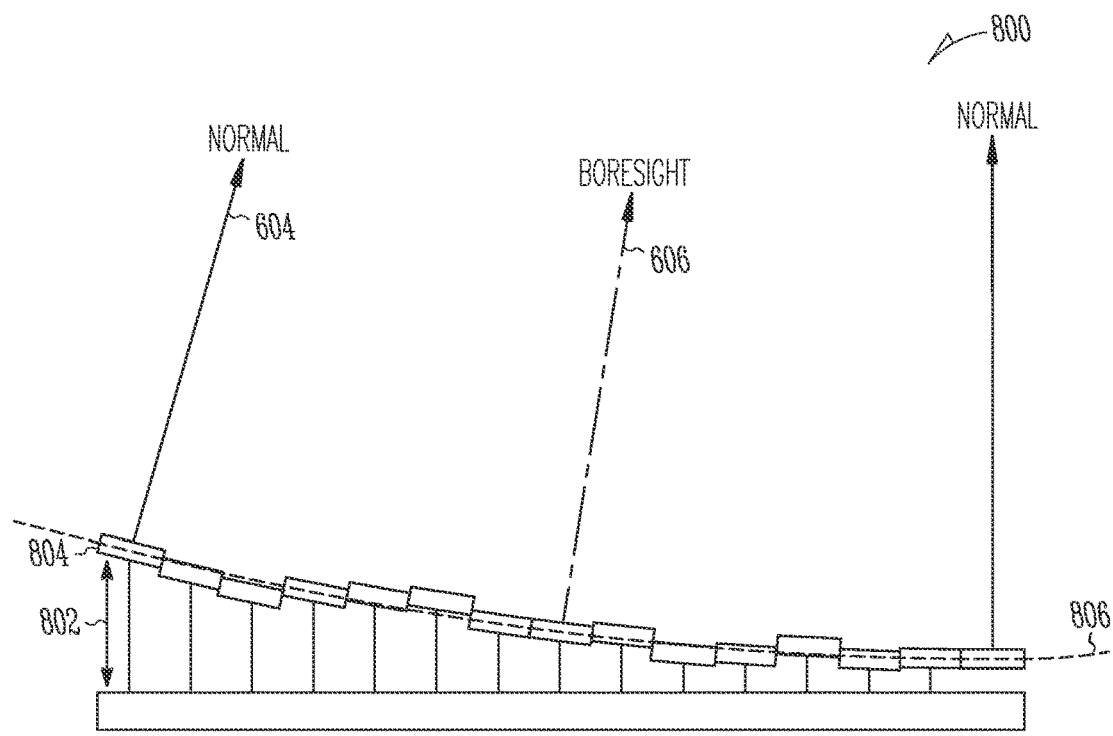
FIG. 8 is an example of using the Piston capability of the MEMS MMA to provide deviations from a continuous surface to maintain zero phase across the beam and/or provide wavefront correction.

As illustrated in FIG. 8, responsive to command signals a MEMS MMA 800 can adjust the piston 802 of mirrors 804 to induce deviations from a continuous mirror surface 806. This can be done to compensate for path length variation of the optical beam (to maintain zero phase across the beam), to correct for atmospheric distortion or both. Adjustments for path length variation can be calibrated offline and stored in a lookup table (LUT) as a function of scan angle. Adjustments for atmospheric distortion are done in real-time during operation of the active imaging system. In FIG. 1, source 134 emits electromagnetic energy in a similar band to illumination e.g., SWIR and beam steerer 136 scans the optical beam onto scene 126. The optical beam preferably has a flat-top across the cross-section of the beam. Wavefront sensor 138 measures the wavefront of the reflected beam to determine the effects of atmospheric distortion. Controller 116 computes the requisite piston adjustments required to correct the wavefront and provides them as command signals to the MEMS MMA. In high quality, high performing active imaging systems, the ability to accurately remove the effects of path length variation and atmospheric distortion is critical to achieving useful imagery of the scene, and important features identified within the scene.

Figure 9:
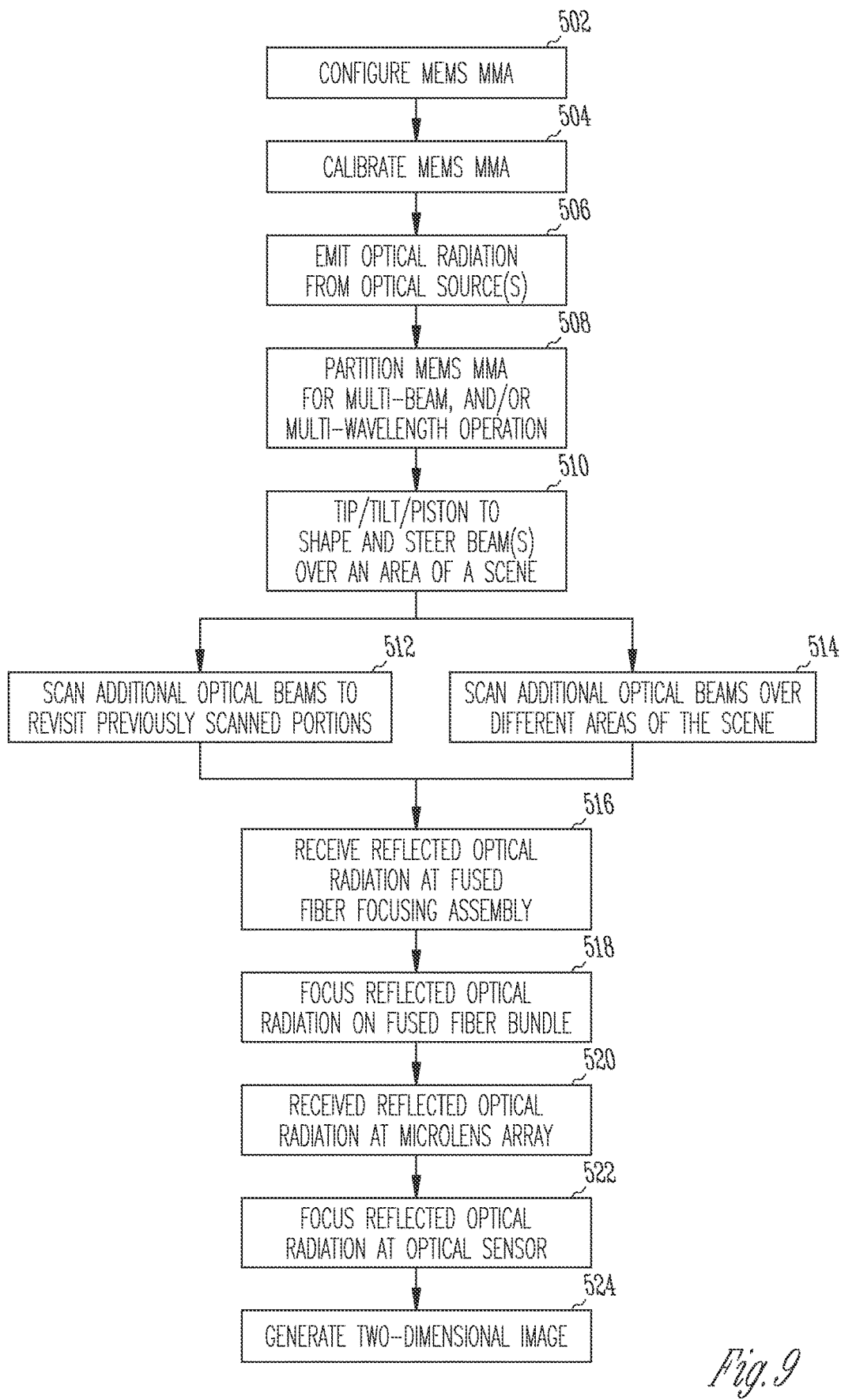
FIG. 9 is an example process flow according to aspects of the invention.

As described above with reference to FIGS. 1-8, several embodiments perform processes that improve known schemes for imaging. In some embodiments, these processes are executed by an imaging system, such as the optical system 100 described above with reference to at least FIG. 1. One example of such a process is illustrated in FIG. 9. According to this example, the process 500 may include the acts of configuring and calibrating a MEMS MMA, partitioning the MEMS MMA for multi-beam/multi-wavelength operation, controlling mirror Tip/Tip/Piston to shape and steer the beam(s), scanning the beam(s) to direct optical radiation at an area of a scene, receiving a reflection of the optical radiation at a fused fiber focusing assembly, focusing the reflected optical radiation directly onto a fused fiber bundle, receiving the reflected optical radiation at a micro-lens array, and focusing the reflected optical radiation onto an optical sensor. In various embodiments, the process 500 may further include generating a two-dimensional image of the scene based at least in part on the reflected optical radiation.

In various embodiments, the optical system 100 described with reference to at least FIG. 1 begins the process 500 at an initial condition. For instance, the initial condition may include an initial field of view at an initial area of a scene to be imaged. Such initial conditions serve as a starting point for the acts discussed below. It is appreciated that in certain embodiments acts 502-524 may be performed in the order discussed below. However, in various other embodiments, acts 502-524 may be performed in any other suitable order, and each act may be performed for any suitable number of iterations.

In act 502 the process 500 may include, configuring the MEMS MMA to, for example, provide just tip/tilt actuation or tip/tilt/piston actuation, and provide different sections of the MMA with different reflective coatings for independent multi-spectral operation or the same broadband coating to produce each optical beam with multiple spectral components.

In act 504 the process 500 may include calibrating the MEMS MMA to determine the command signals to shape a particular optical beam to provide, for example, focus and to provide specific steering angles. For each of these the command signals to tip/tilt/piston each mirror can be stored in different LUTs.

In act 506, the process 500 may include emitting optical radiation from the optical source(s) along the transmit path (s). A single narrowband or broadband optical source may illuminate the entire MEMS MMA. Multiple sources may illuminate different sections of the MEMS MMA and be combined into a single beam. Multiple narrowband sources at different wavelengths may illuminate different sections of the MEMS MMA for independent multi-spectral scanning.

In act 508, the process 500 may partition the MEMS MMA for multi-segment, multi-spectral or beam combined operation. In act 510, the mirrors within each partitioned are actuated to shape and steer the one or more optical beams at the same or different wavelengths. Beam "shaping" may include for example, focusing the beam or providing deviations of the wavefront to compensate for path length variation and/or atmospheric distortion.

In act 508, the process 500 scans an optical beam(s) over at least a first area of the scene. Act 508 may further include scanning additional optical beams to revisit previously scanned portions in act 512 or scanning additional optical beams in parallel over different areas of the scene in act 514.

In act 516, the process 500 may include receiving reflection(s) of the optical radiation from the area of the scene at a fused fiber focusing assembly, such as the fused fiber focusing assembly 124 shown in at least FIG. 1. Specifically, the process 500 may include receiving reflected optical radiation from the area of the scene at one or more of a plurality of lenses of the fused fiber focusing assembly. As discussed above with reference to at least the example fused fiber focusing assembly 124 shown in FIG. 3, in various embodiments the fused fiber focusing assembly may include a first lens and a second lens. Accordingly, in at least one embodiment, act 516 may include receiving the reflected optical radiation at the first lens and transmitting the reflected optical radiation from the first lens to the second lens.

In certain embodiments, the process 500 may further include adjusting one or more mirrors of a micro mirror device interposed between the first lens and the second lens, and positioned at a focal point of the imaging system. In particular, individual control of one or more of the microscopic mirrors of the micro mirror device may reduce noise in images produced by the optical system. For example, the process 500 may include limiting a field angle of the reflected optical radiation received from the first area of the scene at the micro mirror device. Accordingly, in such embodiments the process 500 may include applying one or more control signals (e.g., from the controller 116 of FIG. 1), such as a controlled voltage, to the micro mirror device to adjust a position of the one or more mirrors of the micro mirror device.

As further discussed above with reference to at least FIG. 3, in various embodiments the fused fiber bundle includes a plurality of optical fibers, bound together to form a single fused fiber bundle. In response to receiving the reflected optical radiation at the second lens of the plurality of lenses, the process 500 may include focusing the reflected optical radiation from the first area of the scene directly onto the fused fiber bundle (act 518). Once received at the fused fiber bundle, the process 500 may further include propagating the reflected optical radiation along a length of the fused fiber bundle, and in particular, along a length of the one or more optical fibers of the fused fiber bundle. That is, in various embodiments the process 500 may include receiving the reflected optical radiation from the second lens at the receiving end of the fused fiber bundle, and propagating the reflected optical radiation along the fused fiber bundle in a direction of a transmitting end.

In one example, the fused fiber bundle may include a fiber taper, which defines a magnification ratio or a de-magnification ratio. In such an embodiment, the process 500 may also include magnifying or de-magnifying the reflected optical radiation during propagation along the length of the fused fiber bundle. Once the reflected optical radiation arrives at the transmitting end of the fused fiber bundle, the process 500 may further include directing the reflected optical radiation from the fused fiber bundle to a microlens array (act 520). In particular examples, the microlens array is defined by a large numerical aperture, which allows collection of reflected optical radiation over an angular range greater than the angular range of divergence from the fused fiber bundle 206 (e.g., an angular range greater than 50 degrees). In certain examples, the process 500 may further include receiving the reflected optical radiation from the microlens array at a focusing lens, and focusing the reflected optical radiation onto the optical sensor act 522).

In certain examples, the process 500 may include receiving the reflected optical radiation at the active portion of the optical sensor, and in particular, one or more active unit cells of the optical sensor. As discussed above with reference to at least FIG. 1, each active unit cell may collect and integrate the received photons of light during an integration period. After the expiration of the integration period, the process 500 may include deactivating each unit cell of the selected pattern and reading out a value for each deactivated unit cell. Each read out value may be transmitted to other components of the optical system and used to construct an image of the observed scene (act 524).

As discussed above with reference to FIG. 1, in various embodiments the optical sensor may include a two-dimensional array of unit cells arranged in one or more rows or columns. However, in certain other examples the optical sensor may include a reduced number of unit cells, such as a single linear array of unit cells or a single unit cell. Such an arrangement may correspond to one or more fan beams or spot beams directed by the MEMS MMA over one or more areas of the scene. In particular, the MEMS MMA may control the beamsteering of the optical radiation such that a fan beam or spot beam is defined by a shape substantially corresponding to the dimensions of the linear array of unit cells. In such an embodiment, the process 500 may include one or more acts of generating an image from the received optical radiation reflected from the areas of the scene illuminated (act 524). For example, the process 500 may include the act of generating a two-dimensional image of the scene based at least in part on the reflected optical radiation from a first area of the scene and the reflected optical radiation from a second area of the scene. Such embodiments may include constructing an image of the scene (or a section of the scene), using one or more image construction algorithms based on one or more read-out values provided by the optical sensor.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

We claim:

1. An imaging system comprising:
an optical scanning subsystem including an optical source configured to generate a beam of optical radiation and a Micro-Electro-Mechanical System (MEMS) Micro-Mirror Array (MMA) comprising a plurality of independently and continuously controllable mirrors responsive to command signals to tip and tilt each mirror, the MEMS MMA being configured to re-direct the beam to illuminate a portion of a scene and to steer the beam over an area of a scene;
a detection subsystem including an optical sensor configured to collect reflected optical radiation from the area of the scene; and
a fused fiber focusing assembly including:
a fused fiber bundle,
a plurality of lenses, the plurality of lenses being coupled together and positioned to receive and focus the reflected optical radiation from the area of the scene directly onto the fused fiber bundle,
a microlens array interposed between the fused fiber bundle and the optical sensor, the microlens array being positioned to receive the reflected optical radiation from the fused fiber bundle, and
a focusing lens positioned to direct the reflected optical radiation from the microlens array onto the optical sensor.

2. An imaging system, comprising:
an optical scanning subsystem including an optical source configured to generate a beam of optical radiation and a Micro-Electro-Mechanical System (MEMS) Micro-Mirror Array (MMA) comprising a plurality of independently and continuously controllable mirrors responsive to command signals to tip and tilt each mirror, the MEMS MMA being configured to re-direct the beam to illuminate a portion of a scene and to steer the beam over an area of the scene over a scan range of at least 30°×30° and steering rate of at least 1 kHz;
a detection subsystem including an optical sensor configured to collect reflected optical radiation from the area of the scene; and
a fused fiber focusing assembly including:
a fused fiber bundle,
a plurality of lenses, the plurality of lenses being coupled together and positioned to receive and focus the reflected optical radiation from the area of the scene directly onto the fused fiber bundle,
a microlens array interposed between the fused fiber bundle and the optical sensor, the microlens array being positioned to receive the reflected optical radiation from the fused fiber bundle, and
a focusing lens positioned to direct the reflected optical radiation from the microlens array onto the optical sensor
wherein the MEMS MMA scans the area of the scene over a scan range of at least 30°×30° and steering rate of at least 1 kHz.

3. The image system of claim 2, wherein the optical sensor includes a first linear array of unit cells, the MEMS MMA being configured to illuminate the portion of the scene with a field of view of the detection subsystem such that an illuminated area of the scene is less than the field of view of the detection subsystem, wherein the fused fiber bundle includes a plurality or ordered optical fibers arranged in a rectilinear pattern, wherein the microlens array is configured to collect the reflected optical radiation over an angular range greater than an angular range of divergence of the fused fiber bundle, wherein the focusing lens is interposed between the microlens array and the optical sensor and configured to focus the reflected optical radiation from the microlens array onto the single linear array of unit cells.

4. The imaging system of claim 1, wherein the mirrors of the MEMS MMA tip and tilt about first and second axes, respectively and piston in translation along a third axis, wherein the mirrors are responsive to command signals to tip, tilt and piston to shape the beam of optical radiation to illuminate the portion of the scene.

5. The imaging system of claim 4, wherein said first and second axis are X and Y orthogonal axes, respectively, and said third axis is a Z axis orthogonal the XY plane such that each mirror rotates about the X and Y orthogonal axes, respectively, and translates along the Z-axis to tip, tilt and piston.

6. The imaging system of claim 5, wherein each said mirror is supported at three fulcrum points, wherein three different pairs of said fulcrum points define three axes at 60 degrees to one another in the XY plane, wherein each said mirror pivots about each said axes to produce tilt, tip and piston in the XYZ space.

7. The imaging system of claim 4, wherein the MEMS MMA is responsive to command signals to tip, tilt and piston the mirrors to focus the beam of optical radiation.

8. The imaging system of claim 7, wherein the MEMS MMA is responsive to command signals to selectively focus the beam of optical radiation into a fan beam or a spot beam.

9. The imaging system of claim 1, wherein the mirrors of the MEMS MMA tip, tilt and piston, wherein the mirrors are responsive to command signals to tip, tilt and piston to shape the beam to perform one or more of the following:
adjust a size, divergence or intensity profile of the beam;
produce deviations in the wavefront of the beam to compensate for atmospheric distortion;
produce deviations in the wavefront of the beam to adjust the phase for path length variations across the beam and maintain a zero phase difference across the beam;
add optical power to focus or defocus the beam; and
partition MMA into a number of sections and approximate a continuous surface across the mirrors at the specified tip and tilt within each section.

10. The imaging system of claim 1, wherein the MEMS MMA is responsive to command signals to partition itself into a plurality of segments, each segment including a plurality of mirrors, and to tip and tilt the mirrors in each segment to re-direct the beam of optical radiation into a plurality of beams and to independently steer the beams in respective steering patterns over a plurality of areas of the scene.

11. The imaging system of claim 10, wherein the MEMS MMA is responsive to command signals to simultaneously steer the plurality of beams over different areas of the scene.

12. The imaging system of claim 10, wherein a controller is coupled to the detection subsystem and is configured to process collected optical radiation from one or more areas to detect one or more objects, wherein the controller issues command signals to the MEMS MMA to steer at least one said beam over the area in a scan pattern and to steer at least one said beam to a specific location at which the object is detected to interrogate the object while a scan of the area is ongoing.

13. The imaging system of claim 12, wherein the controller is configured to adapt the partition of the MEMS MMA to change the number of segments in accordance with a number of beams required to interrogate the detected objects.

14. The imaging system of claim 10, wherein the mirrors in each segment have optical coatings that reflect light at different wavelengths such that the optical radiation is re-directed into the plurality of beams at different wavelengths.

15. The imaging system of claim 14, wherein the mirrors in different sections produce beams that span a visible band of at least 450 nm-750 nm, a short-wave infrared (SWIR) band of at least 900 nm-2000 nm, and a mid-wave infrared (MWIR) of at least 3000 nm-5000 nm.

16. The imaging system of claim 10, wherein a controller is coupled to the detection subsystem and is configured to process collected optical radiation from one or more areas to detect one or more objects, wherein the controller issues command signals to the MEMS MMA to scan at least one said beam that spans a specified band over the area and to steer at least one said beam at a wavelength within the specified band to a specific location at which the object is detected to interrogate the object while a scan of the area is ongoing.

17. An imaging system comprising:
an optical scanning subsystem including an optical source configured to generate a beam of optical radiation and a Micro-Electro-Mechanical System (MEMS) Micro-Mirror Array (MMA) comprising a plurality of independently and continuously controllable mirrors responsive to command signals to rotate about X and Y orthogonal axes, respectively, and translates along a Z axis orthogonal the XY plane to tip, tilt and piston each mirror, the MEMS MMA being configured to re-direct the beam to illuminate a portion of a scene and to steer the beam over an area of a scene;
a detection subsystem including an optical sensor configured to collect reflected optical radiation from the area of the scene; and
a fused fiber focusing assembly including:
a fused fiber bundle,
a plurality of lenses, the plurality of lenses being coupled together and positioned to receive and focus the reflected optical radiation from the area of the scene directly onto the fused fiber bundle,
a microlens array interposed between the fused fiber bundle and the optical sensor, the microlens array being positioned to receive the reflected optical radiation from the fused fiber bundle, and
a focusing lens positioned to direct the reflected optical radiation from the microlens array onto the optical sensor.

18. An imaging system comprising:
an optical scanning subsystem including an optical source configured to generate a beam of optical radiation and a Micro-Electro-Mechanical System (MEMS) Micro-Mirror Array (MMA) comprising a plurality of independently and continuously controllable mirrors responsive to command signals to partition itself into a plurality of segments, each segment comprising a plurality of mirrors that tip and tilt to re-direct the beam of optical radiation into a plurality of beams and to independently steer the beams in respective steering patterns over a plurality of areas of the scene, wherein the MEMS MMA is responsive to command signals to adapt the partition to change the number of segments in accordance with a number of beams required to interrogate the scene;

a detection subsystem including an optical sensor configured to collect reflected optical radiation from the area of the scene; and a fused fiber focusing assembly including:

a fused fiber bundle, a plurality of lenses, the plurality of lenses being coupled together and positioned to receive and focus the reflected optical radiation from the area of the scene directly onto the fused fiber bundle, a microlens array interposed between the fused fiber bundle and the optical sensor, the microlens array being positioned to receive the reflected optical radiation from the fused fiber bundle, and a focusing lens positioned to direct the reflected optical radiation from the microlens array onto the optical sensor.

19. The imaging system of claim 18, wherein the mirrors in each segment reflect light at different wavelengths such that the optical radiation is re-directed into the plurality of beams at different wavelengths.

20. The imaging system of claim 18, wherein a controller is coupled to the detection subsystem and is configured to process collected optical radiation from one or more areas to detect one or more objects, wherein the controller issues command signals to the MEMS MMA to steer at least one said beam that spans a specified band over the area and to steer at least one said beam at a wavelength within the specified band to a specific location at which the object is detected to validate the object while a scan of the area is ongoing.

* * * * *

UNITED STATES PATENT AND TRADEMARK OFFICE
CERTIFICATE OF CORRECTION

PATENT NO. : 11,477,350 B2
APPLICATION NO. : 17/150286
DATED : October 18, 2022
INVENTOR(S) : Uyeno et al.

It is certified that error appears in the above-identified patent and that said Letters Patent is hereby corrected as shown below:

In the Drawings

On sheet 6 of 8, Fig. 6B, delete "1.6 um" and insert --1.6 µm-- therefor

On sheet 6 of 8, Fig. 6B, delete "1.3 um" and insert --1.3 µm-- therefor

On sheet 6 of 8, Fig. 6B, delete "1.0 um" and insert --1.0 µm-- therefor

On sheet 6 of 8, Fig. 6B, delete "0.9-1.7 um" and insert --0.9-1.7 µm-- therefor In the Specification In Column 8, Line 50, delete "KHz" and insert --kHz-- therefor In Column 9, Line 7, delete "12" and insert --112-- therefor In Column 10, Line 58, delete "micro lens" and insert --microlens-- therefor In the Claims In Column 20, Line 58, in Claim 2, after "sensor", insert --,--

Signed and Sealed this
Twelfth Day of September, 2023

Katherine Kelly Vidal
*Director of the United States Patent and Trademark Office*